US012561776B2

(12) United States Patent
Shemiakina et al.

(10) Patent No.: US 12,561,776 B2
(45) Date of Patent: Feb. 24, 2026

(54) IMAGE QUALITY ASSESSMENT FOR TEXT RECOGNITION IN IMAGES WITH PROJECTIVELY DISTORTED TEXT FIELDS

(71) Applicant: Smart Engines Service, LLC, Moscow (RU)

(72) Inventors: Iuliia Aleksandrovna Shemiakina, Saint Petersburg (RU); Elena Evgenyevna Limonova, Moscow (RU); Natalya Sergeevna Skoryukina, Moskovskaya oblast (RU); Vladimir Viktorovich Arlazarov, Moscow (RU); Dmitry Petrovich Nikolaev, Moscow (RU)

(73) Assignee: SMART ENGINES SERVICE, LLC, Moscow (RU)

( * ) Notice: Subject to any disclaimer, the term of this patent is extended or adjusted under 35 U.S.C. 154(b) by 298 days.

(21) Appl. No.: 18/101,689

(22) Filed: Jan. 26, 2023

(65) Prior Publication Data

US 2023/0368355 A1 Nov. 16, 2023

(30) Foreign Application Priority Data

May 16, 2022 (RU) ............................ RU2022113075

(51) Int. Cl.
*G06T 7/00* (2017.01)
*G06T 3/02* (2024.01)
(Continued)

(52) U.S. Cl.
CPC .............. *G06T 7/0002* (2013.01); *G06T 3/02* (2024.01); *G06T 3/40* (2013.01); *G06T 7/60* (2013.01); *G06T 2207/30168* (2013.01)

(58) Field of Classification Search
None
See application file for complete search history.

(56) References Cited

PUBLICATIONS

A. M. Awal, N. Ghanmi, R. Sicre and T. Furon, "Complex Document Classification and Localization Application on Identity Document Images," 2017 14th IAPR International Conference on Document Analysis and Recognition (ICDAR), Kyoto, Japan, 2017, pp. 426-431, doi: 10.1109/ICDAR.2017.77 (Year: 2017).*
Garai, A., Biswas, S., Mandal, S. and Chaudhuri, B.B. (2020), Automatic rectification of warped Bangla document images. IET Image Processing, 14: 74-83. https://doi.org/10.1049/iet-ipr.2019.0831 (Year: 2019).*

(Continued)

*Primary Examiner* — SJ Park
*Assistant Examiner* — Caroline E. Depalma
(74) *Attorney, Agent, or Firm* — Millen, White, Zelano & Branigan, P.C.; Jennifer L. King

(57) ABSTRACT

Image quality assessment for text recognition in images with projectively distorted text fields. A projective transformation is calculated from a restored rectangle, representing a restored text field, to a source quadrangle, representing a projectively distorted text field in a source image. An approximation of a curve of a minimal scaling coefficient level on a plane corresponding to the restored rectangle is constructed, based on calculations of a discriminant of the curve. When the approximation intersects a representation of the restored rectangle, a restoration of the source image is determined to have insufficient image quality for reliable text recognition. When the approximation does not intersect the representation of the restored rectangle, a minimal scaling coefficient is calculated at a point inside the restored rectangle, and a determination of whether or not the restoration of the source image has sufficient image quality is made based on the minimal scaling coefficient.

18 Claims, 8 Drawing Sheets

(51) Int. Cl.
   G06T 3/40      (2024.01)
   G06T 7/60      (2017.01)

(56)                References Cited

PUBLICATIONS

Q. Ye and D. Doermann, "Text Detection and Recognition in Imagery: A Survey," in IEEE Transactions on Pattern Analysis and Machine Intelligence, vol. 37, No. 7, pp. 1480-1500, Jul. 1, 2015, doi: 10.1109/TPAMI.2014.2366765. (Year: 2015).*

Bulatov et al., "Smart IDReader: Document Recognition in Video Stream," 2017 14th IAPR International Conference on Document Analysis and Recognition, 2017 IEEE, pp. 39-44.

Liu et al., "How Safe Is Safe Enough for Self-Driving Vehicles?," Risk Analysis, vol. 0, No. 0, 2018, DOI: 10.1111/risa.13116, pp. 1-11.

Wu et al., "An Integrated Ensemble Learning Model for Imbalanced Fault Diagnostics and Prognostics," IEEE Access, vol. 6, 2018, pp. 8394-8402.

Arlazarov et al., "Analysis of the features of the use of stationary and mobile small-sized digital video cameras for document recognition," ResearchGate, Sep. 2014, pp. 71-81.

Dodge et al., A Study and Comparison of Human and Deep Learning Recognition Performance Under Visual Distortions, 2017 IEEE, 7 pages.

Alsmirat et al., "Impact of digital fingerprint image quality on the fingerprint recognition accuracy," Multimed Tools Appl, https://doi.org/10.1007/s11042-017-5537-5, (2019) 78:3649-3688.

Ferrara et al., "On the Effects of Image Alterations on Face Recognition Accuracy," Springer International Publishing Switzerland 2016, T. Bourlai (ed.), Face Recognition Across the Imaging Spectrum, DOI 10.1007/978-3-319-28501-6_9, pp. 195-222.

Chernov et al., "Image quality assessment for video stream recognition systems," In Tenth International Conference on Machine Vision, (2017), Issue 4, pp. 71-82.

Chernov et al., "Application of dynamic saliency maps to the video stream recognition systems with image quality assessment," Eleventh International Conference on Machine Vision (ICMV 2018) Mar. 15, 2019, vol. 11041, SPIE, 9 pages.

K.B. Bulatov, "A Method to Reduce Errors of String Recognition Based on Combination of Several Recognition Results With Per-Character Alternatives," Bulletin of the South Ural State University, Ser. Mathematical Modelling, Programming & ComputerSoftware (Bulletin SUSU MMCS), 2019, vol. 12, No. 3, pp. 74-88.

Petrova et al., "Methods of Weighted Combination for Text Field Recognition in a Video Stream," arXiv:1911.12028v1 [cs.CV] Nov. 27, 2019, 6 pages.

Athar et al., "A Comprehensive Performance Evaluation of Image Quality Assessment Algorithms," IEEE Access, vol. 7, 2019, pp. 140030-140070.

Zhai et al., "Perceptual image quality assessment: a survey," Sciece China. Information Sciences, Nov. 2020, vol. 63 211301:1-211301:52, 54 pages.

Fu et al., "Learning to Detect Specular Highlights from Real-world Images," Poster Session D1: Deep Learning for Multimedia, MM '20, Oct. 12-16, 2020, Seattle, WA, USA, pp. 1873-1881.

Tian et al., "Real-time Specularity Detection Using UnnormalizedWiener Entropy," 2013 International Conference on Computer and Robot Vision, 2013 IEEE, 8 pages.

Chernov et al., "An Algorithm for Detection and Phase Estimation of Protective Elements Periodic Lattice on Document Image," ISSN 1054-6618, Pattern Recognition and Image Analysis, 2017, vol. 27, No. 1, pp. 53-65.

Kunina et al., "Blind Radial Distortion Compensation in a Single Image Using Fast Hough Transform," Computer Optics 2016; 40(3): 395-403.

Arlazarov et al., "MIDV-500: a dataset for identity document analysis and recognition on mobile devices in video stream," Computer Optics 2019, 43(5), pp. 818-824.

Skoryukina et al., "Fast method of ID documents location and type identification for mobile and server application," 2019 International Conference on Document Analysis and Recognition (ICDAR), 2019 IEEE, pp. 850-857.

Awal et al., "Complex Document Classification and Localization Application on Identity Document Images," 2017 14th IAPR International Conference on Document Analysis and Recognition, 2017 IEEE, pp. 426-431.

Oleg A. Slavin, "Using Special Text Points in the Recognition of Documents," Springer Nature Switzerland AG 2020, https://doi.org/10.1007/978-3-030-32579-4_4, pp. 43-53.

Bagdanov et al., "Fine-grained document genre classification using first order random graphs," Proceedings of Sixth International Conference on Document Analysis and Recognition, 2001 IEEE, pp. 79-83.

Ryan et al., "An Examination of Character Recognition on ID card using Template Matching Approach," Procedia Computer Science 59 ( 2015 ), pp. 520-529.

Hartley et al., "Multiple View Geometry in Computer Vision," (Second Edition), Cambridge University Press 2000, 2003, entire book.

Trusov et al., "The Analysis of Projective Transformation Algorithms for Image Recognition on Mobile Devices," arXiv:1912.01401v1 [cs.CV] Dec. 3, 2019, 8 pages.

Shemiakina et al., "Automatic cropping of images under projective transformation," Conference Paper—Mar. 2019, DOI: 10.1117/12.2523483, 9 pages.

GitHub: tesseract-ocr, "tesseract-ocr," Tesseract OCR, https://github.com/tesseract-ocr/, © 2023 GitHub, Inc., 2 pages.

Bulatov et al., "MIDV-2019: Challenges of the modern mobile-based document OCR," arXiv:1910.04009v1 [cs.CV] Oct. 9, 2019, 6 pages.

* cited by examiner

Purposely Blurry
FIG. 3A
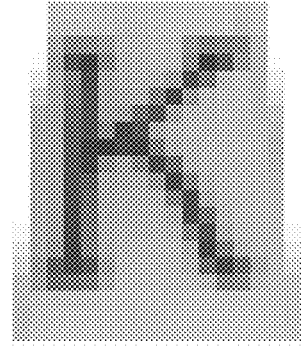
*restoration*
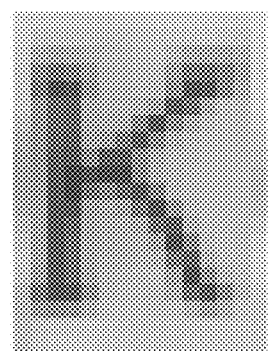
*restoration*
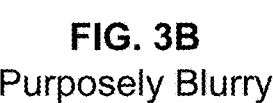
FIG. 3B
Purposely Blurry

Figure 5:
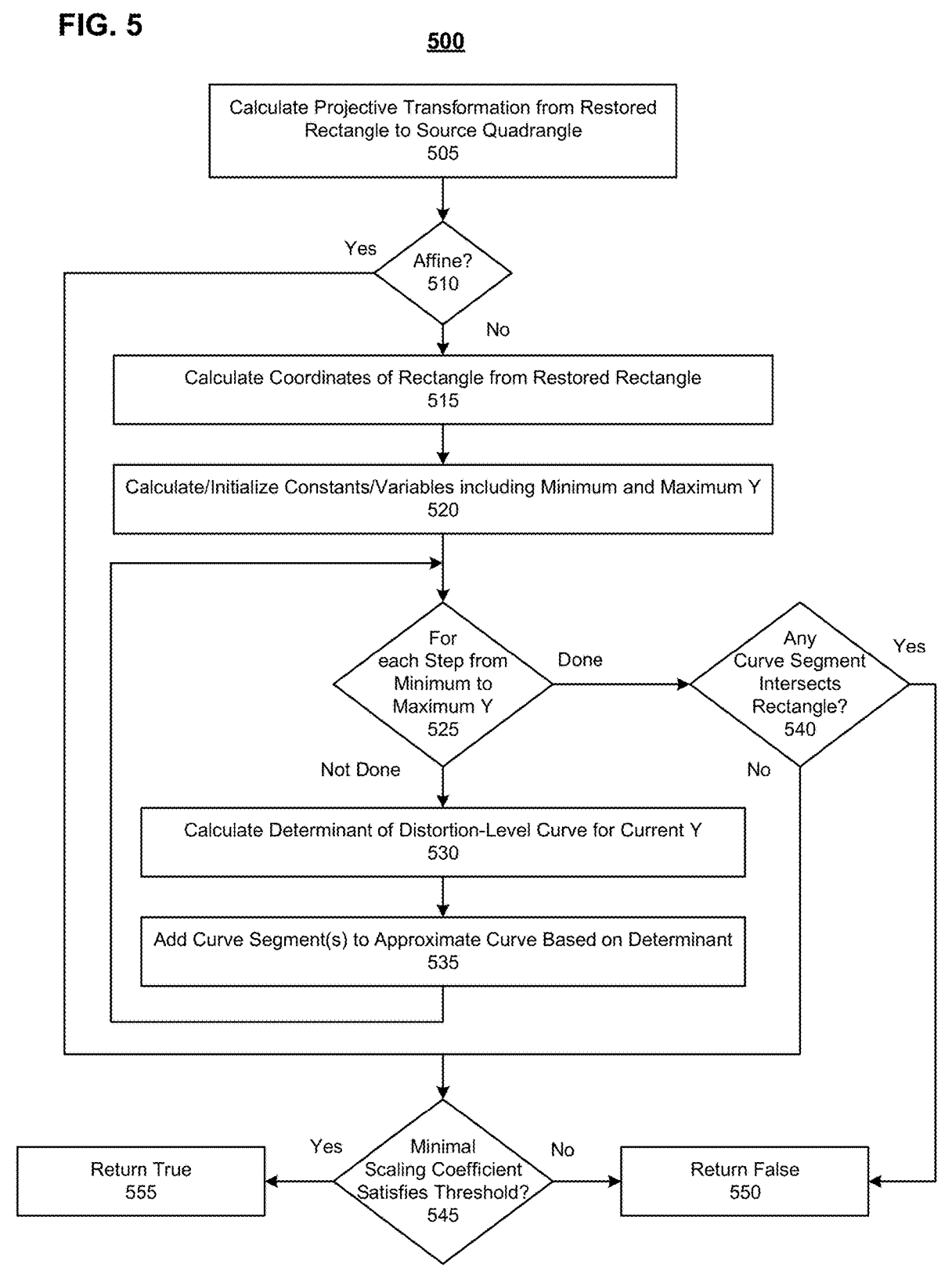

Calculate Projective Transformation from Restored
Rectangle to Source Quadrangle
505

Yes      Affine?
510

No

Calculate Coordinates of Rectangle from Restored Rectangle
515

Calculate/Initialize Constants/Variables including Minimum and Maximum Y
520

For
each Step from
Minimum to
Maximum Y
525

Done

Any
Curve Segment
Intersects
Rectangle?
540

Yes

No

Not Done

Calculate Determinant of Distortion-Level Curve for Current Y
530

Add Curve Segment(s) to Approximate Curve Based on Determinant
535

Minimal
Scaling Coefficient
Satisfies Threshold?
545

Yes

No

Return True
555

Return False
550

FIG. 8
Purposely Blurry

FIG. 9
Purposely Blurry

IMAGE QUALITY ASSESSMENT FOR TEXT RECOGNITION IN IMAGES WITH PROJECTIVELY DISTORTED TEXT FIELDS

CROSS-REFERENCE TO RELATED APPLICATIONS

This application claims priority to Russian Patent App. No. 2022113075, filed on May 16, 2022, which is hereby incorporated herein by reference as if set forth in full.

BACKGROUND

Field of the Invention

The embodiments described herein are generally directed to image quality assessment, and, more particularly, to determining the reliability of text recognition in images with projectively distorted text fields in documents or other objects.

Description of the Related Art

Object recognition has a wide range of real-world applications, and the object-recognition problem has become highly developed in the past decades. The first priority is always the accuracy of recognition systems. However, the cost of errors largely depends on the specifics of the recognition problem or the specifics of the particular application in which the recognition system is to be used. In many contexts, such as identity verification, autonomous vehicles, and industrial diagnostics, incorrect recognition may cause financial loss or even physical injury. For such systems, it is vital to be able to predict the reliability of their recognition results. Obtaining a doubtful result should lead to a rejection of the image processing or a transfer of control back to the user, in order to prevent or mitigate unfortunate consequences.

One of the most important sources of unstable recognition is bad image quality. An image may have bad image quality for a variety of reasons, including compression, transmission artifacts, uncontrolled capture conditions (e.g., with the presence of highlights, motion blur, defocusing, geometrical distortions, etc.), and/or the like. Different image distortions have been shown to correlate to recognition accuracy. Thus, it may be advantageous for recognition systems to utilize estimations of image quality to control the accuracy and reliability of recognition results.

SUMMARY

Systems, methods, and non-transitory computer-readable media are disclosed for image quality assessment for text recognition in images with projectively distorted text fields.

In an embodiment, a method is disclosed that uses at least one hardware processor to, for each of one or more source images: calculate a projective transformation from a restored rectangle to a source quadrangle, wherein the source quadrangle corresponds to a projectively distorted text field in the source image, and wherein the restored rectangle corresponds to a restored text field in a restoration of the source image; and execute a process to construct an approximation of a curve of a minimal scaling coefficient level on a plane corresponding to the restored rectangle based on calculations of a discriminant of the curve, when the approximation of the curve intersects a representation of the restored rectangle, determine that the restoration of the source image has insufficient image quality for reliable text recognition, and, when the approximation of the curve does not intersect the representation of the restored rectangle, calculate a minimal scaling coefficient at a point inside the restored rectangle, when the minimal scaling coefficient satisfies a threshold, determine that the restoration of the source image has sufficient image quality for reliable text recognition, and, when the minimal scaling coefficient does not satisfy the threshold, determine that the restoration of the source image has insufficient image quality for reliable text recognition.

The method may further comprise using the at least one hardware processor to, for each of the one or more source images, when determining that the restoration of the source image has insufficient image quality for reliable text recognition, preventing the source image from being used in an image restoration process or a text recognition process. The method may further comprise using the at least one hardware processor to, when preventing the source image from being used in the text recognition process, provide an indication that the source image has insufficient image quality.

The one or more source images may comprise a plurality of image frames in a video stream, and the method may further comprise using the at least one hardware processor to, based on a determination that the restoration of at least one of the plurality of image frames has insufficient image quality for reliable text recognition, reduce a weight of the at least one image frame in a text recognition process that combines image frames to recognize text in the video stream.

The one or more source images may comprise a plurality of image frames in a video stream, and the method may further comprise using the at least one hardware processor to, based on a determination that the restoration of at least one of the plurality of image frames has insufficient image quality for reliable text recognition, prevent the at least one image frame from being used in an image restoration process or a text recognition process that combines image frames to recognize text in the video stream.

The minimal scaling coefficient may comprise a ratio of a length of a semi-minor axis in an ellipse, in the source quadrangle, that corresponds to a circle representing a point in the restored rectangle, to a radius of the circle.

The minimal scaling coefficient may comprise a length of a semi-minor axis in an ellipse, in the source quadrangle, that corresponds to a circle representing a point in the restored rectangle.

In the same embodiment or in a separate embodiment, a method is disclosed that comprises using at least one hardware processor to select the threshold based on a font of the text field. This method may further comprise using the at least one hardware processor to: determine the font of the text field; and select a predefined threshold associated with the font from a plurality of predefined thresholds associated with a plurality of fonts. The method may further comprise using the at least one hardware processor to automatically determine each of the plurality of predefined thresholds by, for each of the plurality of fonts: for each of one or more sample text field images of a text field in that font, iteratively downscaling the text field image and executing a text recognition process on the downscaled text field image, to determine a smallest scale at which text in that font is correctly recognized by the text recognition process; and associate the determined smallest scale with that font, as the predefined threshold associated with that font.

The method may further comprise generating the representation of the restored rectangle by transforming the restored rectangle to a new coordinate system. The restored rectangle may be transformed to the new coordinate system by the following transformation T:

$$(X, Y)=T(x, y)=(h_{2,1}x-h_{2,0}y,h_{2,0}x+h_{2,1}y+h_{2,2}) \quad 5$$

wherein X and Y are coordinates in the new coordinate system that correspond to coordinates x and y in the restored rectangle, respectively, and wherein $h_{0,2},h_{1,2},h_{2,2}$ are coefficients in a row of a matrix of the projective transformation.

Constructing the approximation of the curve may comprise: calculating a minimum Y value of the representation of the restored rectangle in a coordinate system; calculating a maximum Y value of the representation of the restored rectangle in the coordinate system; for each of a plurality of Y values between the minimum Y value and the maximum Y value, determine two corresponding X values on the curve. Determining two corresponding X values may comprise calculating two corresponding X values as:

$$X_1 = \frac{\alpha\gamma + \beta\delta}{\alpha^2 + \beta^2} + \sqrt{D}$$

$$X_2 = \frac{\alpha\gamma + \beta\delta}{\alpha^2 + \beta^2} - \sqrt{D} \quad 25$$

$$D = l^2 \frac{h_{2,0}^2 + h_{2,1}^2}{\alpha^2 + \beta^2} Y^4 - Y^2 - \frac{(\alpha\delta - \beta\gamma)^2}{(\alpha^2 + \beta^2)^2} + \frac{\det(H)^2(h_{2,0}^2 + h_{2,1}^2)}{l^2 Y^2(\alpha^2 + \beta^2)}, \; Y \neq 0$$

$$\alpha = h_{0,0}h_{2,1} - h_{0,1}h_{2,0}$$

$$\beta = h_{1,0}h_{2,1} - h_{1,1}h_{2,0}$$

$$\delta = h_{2,0}c_3 + h_{2,1}c_4$$

$$\gamma = h_{2,0}c_1 + h_{2,1}c_2 \quad 35$$

$$c_1 = h_{0,0}h_{2,2} - h_{0,2}h_{2,0}$$

$$c_2 = h_{0,1}h_{2,2} - h_{0,2}h_{2,1}$$

$$c_3 = h_{1,0}h_{2,2} - h_{1,2}h_{2,0}$$

$$c_4 = h_{1,1}h_{2,2} - h_{1,2}h_{2,1} \quad 40$$

wherein l is the threshold, det(H) is a determinant of a projective transformation matrix H representing the projective transformation, and $h_{i,j}, i,j \in \{0,1,2\}$ are coefficients of the projective transformation matrix H.

The method may further comprise using the at least one hardware processor to, for each of the one or more source images: determine if the projective transformation is affine; when determining that the projective transformation is not affine, executing the process; and, when determining that the projective transformation is affine, instead of executing the process, calculate the minimal scaling coefficient at a single point inside the restored rectangle, when the minimal scaling coefficient satisfies the threshold, determine that the restoration of the source image has sufficient image quality for reliable text recognition, and, when the minimal scaling coefficient does not satisfy the threshold, determine that the restoration of the source image has insufficient image quality for reliable text recognition.

The minimal scaling coefficient may be calculated as:

$$s(p_0, H) = \sqrt{\frac{\text{trace}(J_0^T J_0) - \sqrt{\text{trace}(J_0^T J_0)^2 - 4\det(J_0)^2}}{2}} \quad 65$$

-continued $$\det(J_0) = \frac{\det(H)}{(h_{2,0}x_0 + h_{2,1}y_0 + h_{2,2})^3}$$

$$\text{trace}(J_0^T J_0) = \frac{T_1^2 + T_2^2 + T_3^2 + T_4^2}{(h_{2,0}x_0 + h_{2,1}y_0 + h_{2,2})^4}$$

$$T_1 = \alpha y_0 + c_1, \; T_2 = -\alpha x_0 + c_2, \; T_3 = \beta y_0 + c_3, \; T_4 = -\beta x_0 + c_4$$

$$\alpha = h_{0,0}h_{2,1} - h_{0,1}h_{2,0}, \; \beta = h_{1,0}h_{2,1} - h_{1,1}h_{2,0}$$

$$c_1 = h_{0,0}h_{2,2} - h_{0,2}h_{2,0}, \; c_2 = h_{0,1}h_{2,2} - h_{0,1}h_{2,1},$$

$$c_3 = h_{1,0}h_{2,2} - h_{1,2}h_{2,0}, \; c_4 = h_{1,1}h_{2,2} - h_{1,2}h_{2,1}$$

wherein s is the minimal scaling coefficient, $p_0$ is the point with coordinates $x_0$ and $y_0$, H is a projective transformation matrix representing the projective transformation, det(H) is a determinant of the projective transformation matrix H, and $h_{i,j}, i,j \in \{0,1,2\}$ are coefficients of the projective transformation matrix H.

Any of the methods may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 3A and 3B illustrate the restoration of projectively distorted text fields, according to examples;

FIG. 5 illustrates a flowchart of an algorithm for image quality assessment, according to an embodiment;

FIG. 8 illustrates examples of false positives, according to an example implementation of an embodiment; and FIG. 9 illustrates examples of false negatives, according to an example implementation of an embodiment.

DETAILED DESCRIPTION

In an embodiment, systems, methods, and non-transitory computer-readable media are disclosed for image quality assessment for text recognition in images with projectively distorted text fields. After reading this description, it will become apparent to one skilled in the art how to implement the invention in various alternative embodiments and for alternative uses. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example Processing Device

Figure 1:
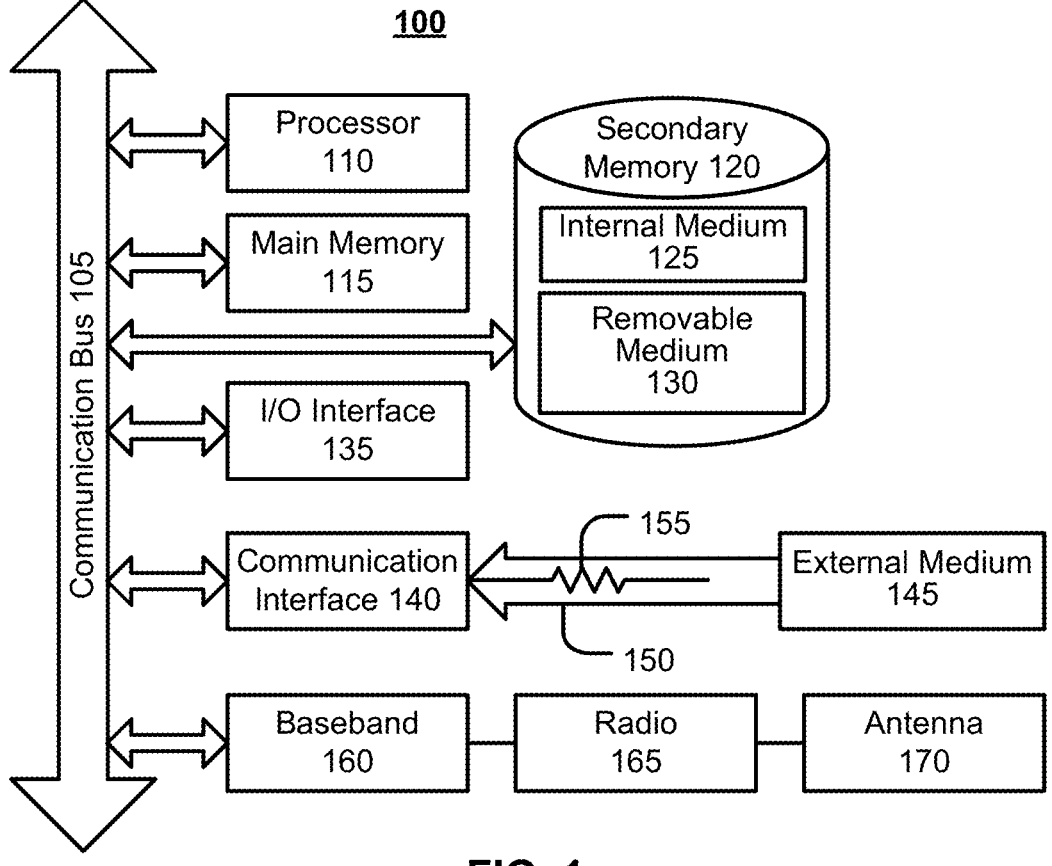
FIG. 1 illustrates an example processing system, by which one or more of the processes described herein, may be executed, according to an embodiment.

FIG. 1 is a block diagram illustrating an example wired or wireless system 100 that may be used in connection with various embodiments described herein. For example, system 100 may be used to execute one or more of the functions, processes, or methods described herein (e.g., one or more software modules of an application implementing the disclosed processes). System 100 can be a server (e.g., which services requests over one or more networks, including, for example, the Internet), a personal computer (e.g., desktop, laptop, or tablet computer), a mobile device (e.g., smartphone), a controller (e.g., in an autonomous vehicle, robot, etc.), or any other processor-enabled device that is capable of wired or wireless data communication. Other computer systems and/or architectures may be also used, as will be clear to those skilled in the art.

System 100 preferably includes one or more processors, such as processor 110. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 110. Examples of processors which may be used with system 100 include, without limitation, the Pentium® processor, Core i7® processor, and Xeon® processor, all of which are available from Intel Corporation of Santa Clara, California.

Processor 110 is preferably connected to a communication bus 105. Communication bus 105 may include a data channel for facilitating information transfer between storage and other peripheral components of system 100. Furthermore, communication bus 105 may provide a set of signals used for communication with processor 110, including a data bus, address bus, and/or control bus (not shown). Communication bus 105 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 100 preferably includes a main memory 115 and may also include a secondary memory 120. Main memory 115 provides storage of instructions and data for programs executing on processor 110, such as one or more of the functions, processes, and/or modules discussed herein. It should be understood that programs stored in the memory and executed by processor 110 may be written and/or compiled according to any suitable language, including without limitation C/C++, Java, JavaScript, Perl, Visual Basic, .NET, and the like. Main memory 115 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 120 may optionally include an internal medium 125 and/or a removable medium 130. Removable medium 130 is read from and/or written to in any well-known manner. Removable storage medium 130 may be, for example, a magnetic tape drive, a compact disc (CD) drive, a digital versatile disc (DVD) drive, other optical drive, a flash memory drive, and/or the like.

Secondary memory 120 is a non-transitory computer-readable medium having computer-executable code (e.g., one or more software modules implementing the disclosed processes) and/or other data stored thereon. The computer software or data stored on secondary memory 120 is read into main memory 115 for execution by processor 110.

In alternative embodiments, secondary memory 120 may include other similar means for allowing computer programs or other data or instructions to be loaded into system 100. Such means may include, for example, a communication interface 140, which allows software and data to be transferred from external storage medium 145 to system 100. Examples of external storage medium 145 may include an external hard disk drive, an external optical drive, an external magneto-optical drive, and/or the like. Other examples of secondary memory 120 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 100 may include a communication interface 140. Communication interface 140 allows software and data to be transferred between system 100 and external devices (e.g. printers), networks, or other information sources. For example, computer software or executable code may be transferred to system 100 from a network server via communication interface 140. Examples of communication interface 140 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 100 with a network or another computing device. Communication interface 140 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 140 are generally in the form of electrical communication signals 155. These signals 155 may be provided to communication interface 140 via a communication channel 150. In an embodiment, communication channel 150 may be a wired or wireless network, or any variety of other communication links. Communication channel 150 carries signals 155 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as one or more software modules implementing the disclosed processes) is stored in main memory 115 and/or secondary memory 120. Computer programs can also be received via communication interface 140 and stored in main memory 115 and/or secondary memory 120. Such computer programs, when executed, enable system 100 to perform the various functions of the disclosed embodiments as described elsewhere herein.

In this description, the term "computer-readable medium" is used to refer to any non-transitory computer-readable storage media used to provide computer-executable code and/or other data to or within system 100. Examples of such media include main memory 115, secondary memory 120 (including internal memory 125, removable medium 130, and/or external storage medium 145), and any peripheral device communicatively coupled with communication interface 140 (including a network information server or other network device). These non-transitory computer-readable media are means for providing executable code, programming instructions, software, and/or other data to system 100.

In an embodiment that is implemented using software, the software may be stored on a computer-readable medium and loaded into system 100 by way of removable medium 130, I/O interface 135, or communication interface 140. In such an embodiment, the software is loaded into system 100 in the form of electrical communication signals 155. The software, when executed by processor 110, preferably causes processor 110 to perform one or more of the processes and functions described elsewhere herein.

In an embodiment, I/O interface 135 provides an interface between one or more components of system 100 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device, in the console of a vehicle, etc.).

In an embodiment, I/O interface 135 provides an interface to a camera (not shown). for example, system 100 may be a mobile device, such as a smartphone, tablet computer, or laptop computer, with one or more integrated cameras (e.g., rear and front facing cameras). Alternatively, system 100 may be a desktop or other computing device that is connected via I/O interface 135 to an external camera. In either case, the camera captures images (e.g., photographs, video, etc.) for processing by processor(s) 110 (e.g., executing the disclosed software) and/or storage in main memory 115 and/or secondary memory 120.

System 100 may also include optional wireless communication components that facilitate wireless communication over a voice network and/or a data network. The wireless communication components comprise an antenna system 170, a radio system 165, and a baseband system 160. In such an embodiment, radio frequency (RF) signals are transmitted and received over the air by antenna system 170 under the management of radio system 165.

In an embodiment, antenna system 170 may comprise one or more antennae and one or more multiplexors (not shown) that perform a switching function to provide antenna system 170 with transmit and receive signal paths. In the receive path, received RF signals can be coupled from a multiplexor to a low noise amplifier (not shown) that amplifies the received RF signal and sends the amplified signal to radio system 165.

In an alternative embodiment, radio system 165 may comprise one or more radios that are configured to communicate over various frequencies. In an embodiment, radio system 165 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 165 to baseband system 160.

If the received signal contains audio information, then baseband system 160 may decode the signal and convert it to an analog signal. Then, the signal is amplified and sent to a speaker. Baseband system 160 may also receive analog audio signals from a microphone. These analog audio signals may be converted to digital signals and encoded by baseband system 160. Baseband system 160 can also encode the digital signals for transmission and generate a baseband transmit audio signal that is routed to the modulator portion of radio system 165. The modulator mixes the baseband transmit audio signal with an RF carrier signal, generating an RF transmit signal that is routed to antenna system 170 and may pass through a power amplifier (not shown). The power amplifier amplifies the RF transmit signal and routes it to antenna system 170, where the signal is switched to the antenna port for transmission.

Baseband system 160 may also be communicatively coupled with processor 110, which may be a central processing unit (CPU). Processor 110 has access to data storage areas 115 and 120. Processor 110 is preferably configured to execute instructions (i.e., computer programs, such one or more software modules implementing the disclosed processes) that can be stored in main memory 115 or secondary memory 120. Computer programs can also be received from baseband processor 160 and stored in main memory 110 or in secondary memory 120, or executed upon receipt. Such computer programs, when executed, enable system 100 to perform the various functions of the disclosed embodiments.

2. Process Overview

Embodiments of processes for image quality assessment for text recognition in images with projectively distorted text fields will now be described. It should be understood that the described processes may be embodied as an algorithm in one or more software modules, forming an application that is executed by one or more hardware processors processor 110, for example, as a software application or library. The described processes may be implemented as instructions represented in source code, object code, and/or machine code. These instructions may be executed directly by the hardware processor(s) 110, or alternatively, may be executed by a virtual machine operating between the object code and the hardware processor(s) 110. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of steps, each process may be implemented with fewer, more, or different steps and a different arrangement and/or ordering of steps. In addition, it should be understood that any step, which does not depend on the completion of another step, may be executed before, after, or in parallel with that other independent step, even if the steps are described or illustrated in a particular order.

2.1. Introduction

Chernov et al., "Image quality assessment for video stream recognition systems," 10th Int'l Conference on Machine Vision (ICMV) 2017, ICMV, vol. 10696, Proceedings of the Society of Photo-Optical Instrumentation Engineers (SPIE) (2017), doi:10.1117/12.2309628, and Chernov et al., "Application of dynamic saliency maps to video stream recognition systems with image quality assessment," 11th ICMV 2018, ICMV, vol. 11041, Proceedings SPIE (2019), doi:10.1117/12.2522768, which are both hereby incorporated herein by reference as if set forth in full, present a model for an optical recognition system with embedded image quality assessment and feedback modules. These image quality assessment and feedback modules can be exploited to connect any pair of sequential subsystems, such as object segmentation, feature extraction, and object classification. In the case of recognition in a video stream, these modules may provide many new opportunities, such as the selection of the best quality image frames from the video stream or the rejection of the worst quality image frames from the video stream. In the case of document recognition, the image quality assessment of text fields in the images enables the confidences of recognized text to be evaluated or reevaluated. For example, the confidences obtained for a particular field in different image frames can be used as weights in the combination method for recognition of text fields in a video stream. See, e.g., Bulatov et al., "A Method to Reduce Errors of String Recognition Based on Combination of Several Recognition Results with Per-Character Alternatives," Bulletin of the South Ural State University, Series: Mathematical Modelling, Programming and Computer Software 12(3), 74-88 (2019), doi:10.14529/mmp190307; Petrova et al., "Methods of weighted combination for text field recognition in a video stream," 12th ICMV 2019, ICMV, vol. 11433, Proceedings SPIE (2020), doi:10.1117/12.2559378; and U.S. patent application Ser. No. 17/180,434, filed on Feb. 19, 2021; which are all hereby incorporated herein by reference as if set forth in full. Embedding the image quality assessment and feedback modules into a system that analyzes single images may result in a rejection scenario in which the system declines to recognize the whole image or one or more low-quality regions of the image.

A variety of no-reference methods have been developed for image quality assessment. The main focus of recent research has been on pixel-based methods. These methods consider distortions, such as blur, digital noise, and compression and transmission artifacts, since these distortions are common for the majority of recognition applications. See, e.g., Athar et al., "A Comprehensive Performance Evaluation of Image Quality Assessment Algorithms," IEEE Access 7, 140030-70 (2019); and Zhai et al., "Perceptual image quality assessment: a survey," Science China Information Sciences 63(11) (2020); which are both hereby incorporated herein by reference as if set forth in full. In addition, methods exist for evaluating a specular highlights saliency map. See, e.g., Fu et al., "Learning to Detect Specular Highlights from Real-world Images," 28th Association for Computing Machinery (ACM) Multimedia Conference 2020, pp. 1873-81 (2020); and Tian et al., "Real-time Specularity Detection Using Unnormalized Wiener Entropy," 2013 Int'l Conference on Computer and Robot Vision, IEEE (2013), doi:10.1109/CRV.2013.45; which are both hereby incorporated herein by reference as if set forth in full. These methods utilize deep learning, an unnormalized form of Wiener Entropy, and other approaches. Chernov et al., "An algorithm for detection and phase estimation of protective elements periodic lattice on document image," Pattern Recognition and Image Analysis 27(1), 53-65 (2017), doi:10.1134/S1054661817010023, which is hereby incorporated herein by reference as if set forth in full, presents a method for detecting holographic elements. Holographic elements can significantly decrease the accuracy of text recognition. The radial distortion level of an image can be evaluated with the entropy model described in Kunina et al., "Blind radial distortion compensation in a single image using a fast Hough transform," Computer optics 40(3), 395-403 (2016), which is hereby incorporated herein by reference as if set forth in full. Pixel-based quality assessment methods need to analyze the whole input image, which can be time-consuming (especially if deep learning is used) and may be a problem for real-time recognition systems.

Geometric quality assessment methods analyze the geometric distortion of an object in an image. In the case of document recognition in images taken with the camera of a mobile device, the most common distortion is a projective transform of a plane. For example, a user trying to avoid highlights may take a photograph with a high projective distortion of the document. In this case, text or other regions in the document image become poorly recognizable. Geometric quality assessment methods allow these regions to be rejected without analyzing their pixel intensities. This approach is fast and suitable for the document-recognition problem. However, there is a lack of research on this subject.

Awal et al., in "Complex document classification and localization application on identity document images," 14th Int'l Association for Pattern Recognition (IAPR) Int'l Conference on Document Analysis and Recognition (ICDAR) 2017, ICDAR, pp. 427-32, IEEE (2017), doi:10.1109/IC-DAR.2017.77, which is hereby incorporated herein by reference as if set forth in full, considered the recognition of rectangular documents. In particular, they obtained document quadrangles and checked three conditions: (1) at least one pair of opposed edges of the document quadrangle is parallel; (2) the average difference in angles between each pair of opposed angles in the document quadrangle is relatively small; and (3) the average perpendicularity of the four vertices of the document quadrangle is less than 25°. In Sanchez-Rivero et al., "Capture of identity document images in the wild: Detection and quality assessment," in Proceedings of the 18th Int'l Convention and Fair Informática (CICCI) 2020, Nairobi, Kenya (Nov. 18-20, 2020), which is hereby incorporated herein by reference as if set forth in full, the criterion includes the following conditions: (1) the ratio of a document quadrangle area to the area of the whole image must exceed a threshold; (2) the aspect ratio for the document quadrangle must fit some predefined interval; and (3) the angles of the document quadrangle must be close to 90°. Unfortunately, Sanchez-Rivero et al. did not report the thresholds and intervals used, so it is impossible to evaluate them experimentally. While these empirical methods are reasonable, there is no theoretical proof or experimental evaluation of their connection to the level of projective distortion and recognition accuracy. For example, considering the relative area of a recognized object, images restored from one area may have significantly different quality.

Thus, an embodiment of a method is disclosed herein for assessing the image quality of images that have been restored from projectively distorted sources. The image quality may be assessed in terms of the probability of correct text recognition. As will be discussed in greater detail elsewhere herein, a particular implementation of the disclosed method was tested experimentally on synthetic data created from the Mobile Identity Document Video (MIDV) 2019 dataset.

2.2. Problem Statement

Document recognition systems commonly comprise several modules, such as modules for document localization in the input image data, extraction of zones (e.g., text fields, photographs, etc.), and the restoration and recognition of fields (e.g., text fields) in the image. With respect to the extraction of zones, such as text fields, the majority of document recognition systems utilize document models. There are three general classes of document models: templates; flexible forms; and end-to-end models. Templates define the strictest constraints on the location of each zone and are mostly commonly used for identity documents. In Skoryukina et al., "Fast method of ID documents location and type identification for mobile and server applications," 15th ICDAR 2019, ICDAR, pp. 850-7, IEEE (2020), doi:/10.1109/ICDAR.2019.00141, which is hereby incorporated herein by reference as if set forth in full, and Awal et al., templates are utilized for localization and classification of documents in images and are suggested to be helpful in field extraction. Flexible form models are based on the results of text recognition and describe documents with mild restrictions on their structures. Flexible form models may comprise text feature points, or attributed relational graphs as a structural representation of the document to be recognized. See, e.g., Salvin, "Using Special Text Points in the Recognition of documents," Cyber-Physical Systems: Advances in Design & Modelling 259, 43-53 (2020); and Bagdanov et al., "Fine-grained document genre classification using first order random graphs," 6th ICDAR 2000, ICDAR, pp. 79-83, IEEE (2001), doi:10.1109/ICDAR.2001.953759; which are both hereby incorporated herein by reference as if set forth in full. End-to-end models imply the simultaneous extraction and recognition of text fields and may not require any document structure. See, e.g., Ryan et al., "An examination of character recognition on ID card using template matching approach," Procedia Computer Science 59, pp. 520-9

(2015), doi:10.1016/j.procs.2015.07.534, which is hereby incorporated herein by reference as if set forth in full.

Document recognition systems for identity documents are typically based on template descriptions of documents. See, e.g., Bulatov et al., "Smart IDReader: Document recognition in video stream," 14th IAPR ICDAR 2017, ICDAR, vol. 6, pp. 39-44, IEEE (2017), doi:10.1109/ICDAR.2017.347, which is hereby incorporated herein by reference as if set forth in full. For many identity documents, the zones of text fields and photographs, as well as text fonts and font properties (e.g., size or height, boldness, etc.), are fixed. This information may be inserted into the template description for the document model and used for assessment of the image quality of the text fields.

Figure 2:
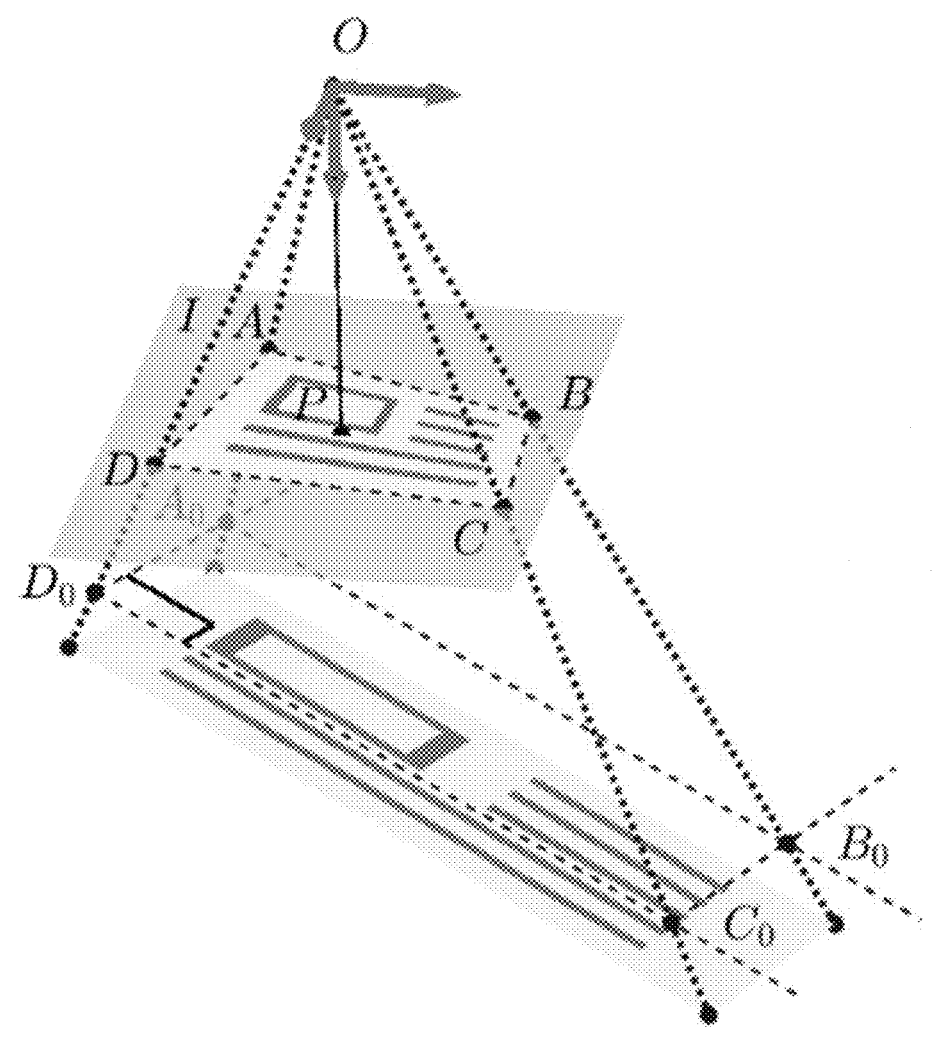
FIG. 2 illustrates projective distortion in imaging, according to an example.

The shape that results from a localization step depends on the manner in which the input image data was captured. A document is typically a flat rectangular object. If the camera of a mobile device is used to capture the image data, the document will often be affected by a projective distortion. See, e.g., Hartley et al., "Multiple View Geometry in Computer Vision, 2nd ed., University Press, New York: Cambridge (2004), which is hereby incorporated herein by reference as if set forth in full. This means that the boundaries of the document in the image data will have the shape of a quadrangle. Moreover, according to the pinhole camera model, as the distance between the document and the center of the camera increases, the number of pixels that represent the document in the image data decreases. FIG. 2 illustrates examples of these phenomena, which lead to the fact that, after the document is projectively restored, different text fields may have different image qualities, different portions of the same text field may have different image qualities, and not all text fields may be capable of being reliably recognized.

Given a predefined module that performs text recognition (e.g., according to any known technique, including optical character recognition (OCR)), the font and size of the text in any text field can be used to estimate the maximum level of projective distortion that still provides stable recognition of the text. This maximum level of projective distortion can be evaluated as a rational value, and will be denoted herein as a threshold level of projective distortion $\theta \in R$. However, it is more convenient to use the inverse value $l \in R$, $l = 1/\theta$, which is referred to as the minimal scaling coefficient threshold. The value of this threshold level only needs to be determined once during development of the particular recognition system. Alternatively, the value of this threshold level may be periodically reevaluated.

The quadrangle of a detected text field in source image data will be denoted as F, the corresponding region of the source image data will be denoted as $I_{src}$, and the rectangle of the restored field image borders, defined in the document model, will be denoted as R. Whether or not the quality of the restored image $I_{rst}$ is sufficient in terms of the reliability of further text recognition can be estimated by a quality assessment function Q. In an embodiment, the input to quality assessment function Q comprises the quadrangle F of the detected text field, the rectangle R representing the borders of the restored text field, and the a priori threshold l representing the minimal scaling coefficient that is acceptable. In an embodiment, the output of quality assessment function Q is a binary value that indicates that either the image quality enables reliable text recognition (e.g., a value of 1 or "true") or the image quality does not enable reliable text recognition (e.g., a value of 0 or "false"):

$$Q: \mathcal{F} \times \mathcal{R} \times \mathbb{R} \to \{0, 1\}$$

wherein $\mathcal{F}$ is the set of all quadrangles lying inside the source image data, wherein $\mathcal{R}$ is the set of all possible rectangles after restoration, and wherein $\mathbb{R}$ is the set of real numbers.

Notably, the quality assessment function Q does not take the restored image $I_{rst}$ itself as an input. This is a significant difference from other quality assessment methods. This difference reflects that, in disclosed embodiments, the evaluation process analyzes the geometric transform, rather than the pixel intensities. Therefore, the quality assessment can be conducted before the restoration.

2.3. Restoration

An example of restoring a single character of text will be discussed. Assuming that the image of the character has a rectangular shape, the corresponding region of the character in the source image data is a quadrangle. The restored image of the character will be recognizable only if the source image data contain sufficient pixels to distinctly represent the character. However, the area of the quadrangle does not, itself, characterize the image quality.

FIGS. 3A and 3B illustrate two examples of the restoration of images of the same character "K" with differing levels of projective distortion. The source images are on the left and the restored images are on the right. It is apparent that the source image in FIG. 3B has a higher level of projective distortion than the source image in FIG. 3A.

For both examples, the areas of the quadrangle, representing the source image, are equal. However, the character recognizability in the restored image in FIG. 3A is significantly better than the character recognizability in the restored image in FIG. 3B. Moreover, the image quality is not homogeneous within each restored image. As illustrated in FIG. 3B, this is especially apparent in the case of a high level of projective distortion. Due to the projective distortion in the source image in FIG. 3B, the bottom portion of the restored image in FIG. 3B is represented by a larger region than the top portion in the source image. Therefore, the bottom portion of the restored image in FIG. 3B has sharper contours than the top portion. Consequently, the image quality of the whole restored image in FIG. 3B is not uniform.

2.4. Image Quality Assessment

Since incorrect recognition of any character will lead to incorrect recognition of the entire text field that contains the character, the image quality of the source image $I_{src}$, comprising the text field, can be estimated according to region of the source image $I_{src}$ having the lowest quality. Then, an image quality can be assigned to each restored pixel in the restored image $I_{src}$ of the text field based on its corresponding region in the source image $I_{src}$. Finally, a decision can be made on the overall quality of the restored image $I_{src}$ based on the image quality values assigned to the restored pixels.

The plane of the source image $I_{src}$ is denoted as $\psi_{src}$, and the plane of the restored image is denoted as $\psi_{rst}$. Both $\psi_{src}$ and $\psi_{rst}$ may be represented as Cartesian coordinate systems. It is assumed that the image intensity functions are continuous. There is a projective transformation H from the restored rectangle R of the text field in the restored image $I_{rst}$ to the source quadrangle F of the text field in the source image $I_{src}$. The projective transformation H is the inverse of the restoration transformation from the source quadrangle F to the restored rectangle R. An arbitrary pixel with coordinates $(x_0, y_0)$ in the restored image $I_{rst}$ can be approximated as the circular neighborhood of a point $p_0=(x_0, y_0)\in \psi_{rst}$. Given that the approximation of a restored pixel in restored image $I_{rst}$ is a circle, the corresponding source region in the source plane $\psi_{src}$ is an ellipse when projective distortion exists.

As mentioned above, the area of the source region in the source plane $\psi_{src}$ is not used as a measure of image quality. However, the ellipse shape illustrates that the restoration transformation affects the source region unevenly along different axes. If a diameter of the ellipse of the source region is shorter than the diameter of the circle of the restored region, there is not enough information for precise restoration. In this case, the chord of the ellipse is stretched to fit the circle, such that the sharpness of the restored contours decreases in the restored region. Interpolation methods may be used to increase the quality of the restored region. See, e.g., Trusov et al., "The analysis of projective transformation algorithms for image recognition on mobile devices," 12th ICMV 2019, ICMV, vol. 11433, Proceedings of SPIE (2020), doi:10.1117/12.2559732, which is hereby incorporated herein by reference as if set forth in full. However, the impact of interpolation is limited, since there is still a level of projective distortion for which interpolation methods cannot provide sufficient image quality for stable recognition. The semi-minor axis of the ellipse of the source region represents the direction with the maximum possible quality deterioration. If the length of this semi-minor axis is much less than the diameter of the circle of the restored region, then the image quality of the restored image $I_{rst}$ will be insufficient for stable recognition. Thus, in an embodiment, for each restored point, the ratio of the length of the semi-minor axis of the source ellipse to the radius of the restored circle is calculated, and compared to a predefined threshold 1 to be used as a binary quality estimation of the point. This ratio is referred to herein as the "minimal scaling coefficient" for the point.

The formula of the minimal scaling coefficient $s_{min}(p_0, H)$ for a point $p_0\in \psi_{rst}$ can be determined. It is assumed that the radius of the restored circle equals one, such that the minimal scaling coefficient $s_{min}$ is simply equal to the length of the semi-minor axis. The projective transformation H is determined as follows:

$$\begin{cases} u = h_x(x, y) = \dfrac{h_{0,0}x + h_{0,1}y + h_{0,2}}{h_{2,0}x + h_{2,1}y + h_{2,2}} \\ v = h_y(x, y) = \dfrac{h_{1,0}x + h_{1,1}y + h_{1,2}}{h_{2,0}x + h_{2,1}y + h_{2,2}} \end{cases}, (x, y) \in \psi_{rst}, (u, v) \in \psi_{src}$$

wherein $h_{i,j}, i, j \in \{0,1,2\}$ are the coefficients of the projective transformation matrix H:

$$H = \begin{pmatrix} h_{0,0} & h_{0,1} & h_{0,2} \\ h_{1,0} & h_{1,1} & h_{1,2} \\ h_{2,0} & h_{2,1} & h_{2,2} \end{pmatrix}$$

As mentioned above, the restored circle for a point is projectively transformed to an ellipse in the source plane $\psi_{src}$. It has been shown in Shemiakina et al., "Automatic cropping of images under projective transformation," 11th ICMV 2018, ICMV, vol. 11041, Proceedings SPIE (2019), doi:10.1117/12.2523483, which is hereby incorporated herein by reference as if set forth in full, that the lengths of the semi-axes of the ellipse are equal to the roots of eigenvalues $\lambda_1, \lambda_2$ of the matrix $J_0{}^T J_0$, wherein $J_0$ is the Jacobian matrix of the projective transformation H of the point $p_0$:

$$J_0 = \text{Jacobian}(H, p_0) = \begin{pmatrix} \dfrac{\partial h_x(x, y)}{\partial x} & \dfrac{\partial h_x(x, y)}{\partial y} \\ \dfrac{\partial h_y(x, y)}{\partial x} & \dfrac{\partial h_y(x, y)}{\partial y} \end{pmatrix}\bigg|_{(x,y)=(x_0,y_0)}$$

$$J_0^T J_0 p = \lambda_i p,\ p \in \psi_{rst},\ i = \{1, 2\}$$

$$s_{min}(p_0, H) = \sqrt{\min(\lambda_1, \lambda_2)},\ s_{max}(p_0, H) = \sqrt{\max(\lambda_1, \lambda_2)}$$

Eigenvalues are roots of the characteristic equation. Thus, the formula for the minimal and maximal scaling coefficient (i.e., the lengths of the semi-axes of the source ellipse) for the restored point $p_0$ is:

$$s_i(p_0, H) = \sqrt{\dfrac{\text{trace}(J_0^T J_0) \pm \sqrt{\text{trace}(J_0^T J_0)^2 - 4\det(J_0)^2}}{2}}, \quad \text{Equation (1)}$$

$$i = \{max, min\}$$

The values of trace and the determinant det of the matrix $J_0{}^T J_0$, expressed in terms of coefficients of the homography H, can be derived as follows:

$$\det(J_0) = \dfrac{\det(H)}{(h_{2,0}x_0 + h_{2,1}y_0 + h_{2,2})^3} \quad \text{Equation (2)}$$

$$\text{trace}(J_0^T J_0) = \dfrac{T_1^2 + T_2^2 + T_3^2 + T_4^2}{(h_{2,0}x_0 + h_{2,1}y_0 + h_{2,2})^4}$$

$$T_1 = \alpha y_0 + c_1,\ T_2 = -\alpha x_0 + c_2,$$

$$T_3 = \beta y_0 + c_3,\ T_4 = -\beta x_0 + c_4$$

$$\alpha = h_{0,0}h_{2,1} - h_{0,1}h_{2,0},\ \beta = h_{1,0}h_{2,1} - h_{1,1}h_{2,0}$$

$$c_1 = h_{0,0}h_{2,2} - h_{0,2}h_{2,0},\ c_2 = h_{0,1}h_{2,2} - h_{0,2}h_{2,1},$$

$$c_3 = h_{1,0}h_{2,2} - h_{1,2}h_{2,0},\ c_4 = h_{1,1}h_{2,2} - h_{1,2}h_{2,1}$$

Notably, if the projective transformation H is affine (i.e., $h_{2,0}{}^2 + h_{2,1}{}^2 = 0$), the Jacobian matrix and the minimal scaling coefficient $s_{min}$ are constant for the whole plane $\psi_{rst}$. Thus, only one value of the minimal scaling coefficient $s_{min}$ at an arbitrary point needs to be calculated. If a projective distortion occurs, the points on the infinity line $l_\infty$:$h_{2,0}x_0 + h_{2,1}y_0 + h_{2,2} = 0$ become infinite under the transformation. Thus, the lengths of both the semi-minor and semi-major axes are not defined on the infinity line, and the length functions domain is $\mathbb{R}^2 \setminus l_\infty$.

Figures 4A, 4B, 4C:
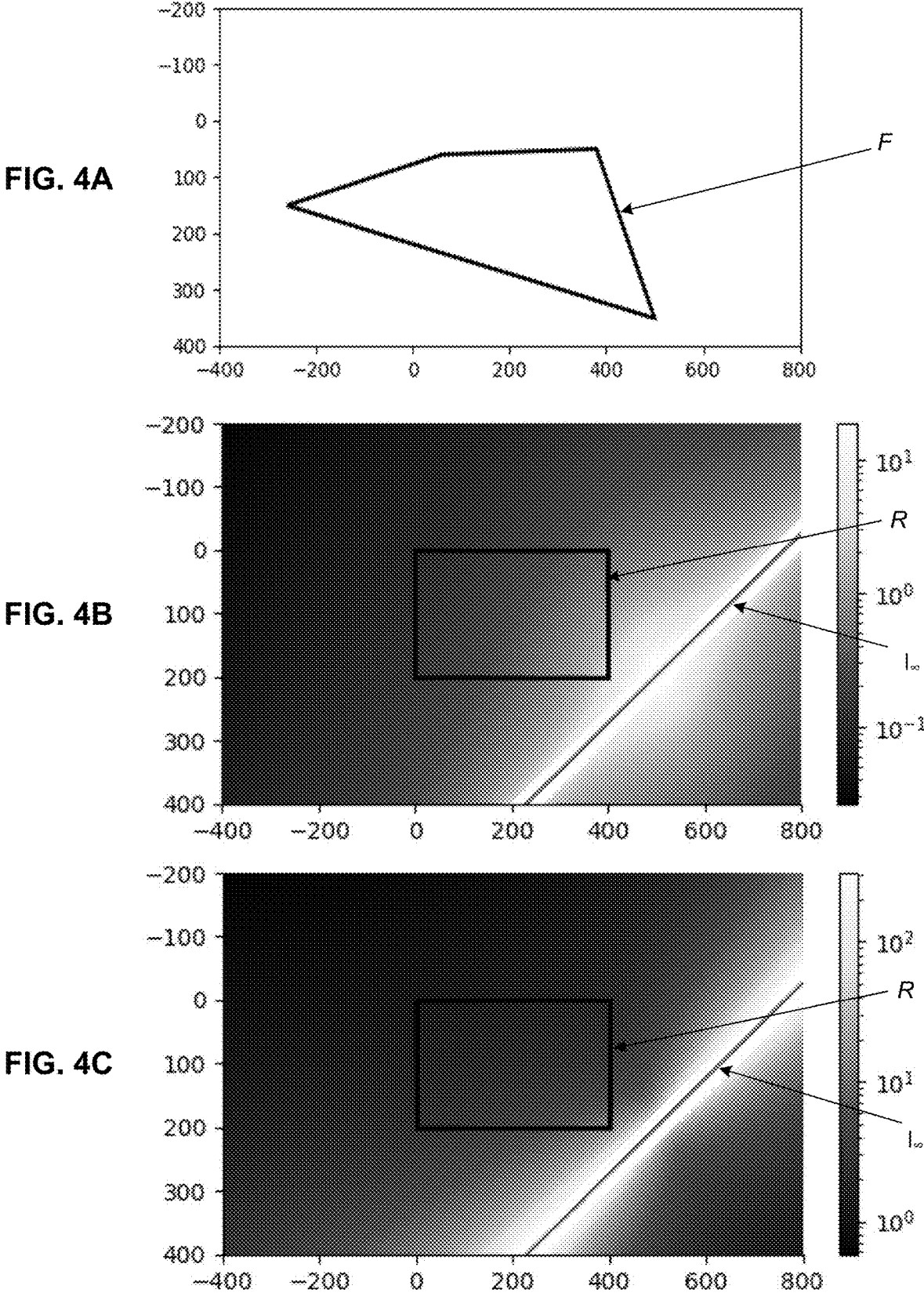
FIGS. 4A-4C illustrate a synthetic example of the behavior of minimal and maximal scaling coefficient functions using heatmaps, according to an embodiment.

FIGS. 4A-4C illustrate a synthetic example of the behavior of the minimal and maximal scaling coefficient functions, $s_{min}$ and $s_{max}$, using heatmaps. In particular, FIG. 4A depicts an arbitrary source quadrangle F, FIG. 4B depicts a restored rectangle R in a heatmap for the estimated minimal scaling coefficient values for grid points on the restored plane $\psi_{rst}$, and FIG. 4C depicts the restored rectangle R in a heatmap for the estimated maximal scaling coefficient values for grid points on the restored plane $\psi_{rst}$. As illustrated, the scaling coefficient values increase as the grid points approach the infinity line $l_\infty$. The region inside the restored rectangle R, with minimal scaling coefficient values less than the threshold l, appears to be connected.

Instead of calculating values of the minimal scaling coefficient $s_{min}$ for each point, a curve representing the level of projective distortion can be constructed. If the curve, where the minimal scaling coefficient values are equal to the threshold l, intersects the restored rectangle R, then one of two parts of the rectangle might not be reliably recognizable. On the other hand, if there is no intersection between the curve and restored rectangle R, the value for one arbitrary point inside restored rectangle R can be calculated to determine whether or not the whole restored rectangle R has sufficient image quality.

According to Equation (1) and Equation (2), the distortion-level curve equation $s_{min}(p, H) = l$, where $p = (x, y)$, can be written as:

$$l^4(h_{2,0}x_0 + h_{2,1}y_0 + h_{2,2})^6 - l^2(h_{2,0}x_0 + h_{2,1}y_0 + h_{2,2})^2(T_1^2 + T_2^2 + T_3^2 + T_4^2) + \det(H)^2 = 0 \quad \text{Equation (3)}$$

Equation (3) is true for both $s_{min}(p, H) = l$ and $s_{max}(p, H) = l$. If the $s_{max}$ branch intersects restored rectangle R, then both parts of the restored rectangle R have low image quality. In order to simplify Equation (3), Equation (3) can be translated to a new coordinate system with transformation T:

$$(X, Y) = T(x, y) = (h_{2,1}x - h_{2,0}y, h_{2,0}x + h_{2,1}y + h_{2,2}) \quad \text{Equation (4)}$$

Under this transformation, Equation (3) becomes quadratic in terms of X. Moreover, the infinity line $l_{28}$ is mapped to the line $Y = 0$.

Equation (4) can be substituted into Equation (3) to obtain:

$$l^4 Y^6 - \quad \text{Equation (5)}$$

$$l^2 \dfrac{\alpha^2 + \beta^2}{h_{2,0}^2 + h_{2,1}^2}\left(Y^4 + \dfrac{(\alpha\delta - \beta\gamma)^2}{(\alpha^2 + \beta^2)^2}Y^2 + \left(X - \dfrac{\alpha\gamma + \beta\delta}{\alpha^2 + \beta^2}\right)^2 Y^2\right) + \det(H)^2 = 0$$

wherein $\gamma = h_{2,0}c_1 + h_{2,1}c_2$ and $\delta = h_{2,0}c_3 + h_{2,1}c_4$.

The distortion-level curve can be approximated by a piecewise-linear curve. For this purpose, minimal and maximal Y values of the restored rectangle R are calculated. Then, several values $Y_i$, wherein $i = \{0, n-1\}$, are chosen between these minimal and maximal Y values. For each $Y_i$, two corresponding X coordinates on the distortion-level curve are calculated according to the following equality:

$$X_{i,j} = \dfrac{\alpha\gamma + \beta\delta}{\alpha^2 + \beta^2} \pm \sqrt{D_i},\ i = \{0, n-1\},\ j = \{1, 2\} \quad \text{Equation (6)}$$

$$D_i = l^2 \dfrac{h_{2,0}^2 + h_{2,1}^2}{\alpha^2 + \beta^2}Y_i^4 - Y_i^2 - \dfrac{(\alpha\delta - \beta\gamma)^2}{(\alpha^2 + \beta^2)^2} = \dfrac{\det(H)^2(h_{2,0}^2 + h_{2,1}^2)}{l^2 Y_i^2(\alpha^2 + \beta^2)},$$

$$Y_i \neq 0$$

It should be taken into account that both branches of the distortion-level curve, for the minimal and maximal scaling coefficient functions, may simultaneously intersect restored rectangle R. In order to correctly construct the curve approximation, the points related to different branches should be separated. Moving along the Y-axis, for each value $Y_i$, the corresponding discriminant $D_i$ is compared to zero. While the discriminant $D_i$ is positive, the obtained points lie on one branch. When the discriminant $D_i$ is zero, this represents an inflection point of the current branch, and the subsequent values $Y_i$ along the Y-axis relate to another branch of the curve. While the discriminant $D_i$ is negative, this implies a gap between branches, and points calculated for subsequent values $Y_i$ lie on another branch.

As soon as the curve approximation is constructed, it can be determined whether the image quality of the text field is sufficient. There are several possible approaches for accomplishing this determination. For example, in one approach, the ratio of the area of sufficient image quality inside the restored rectangle R to the area of insufficient image quality inside the restored rectangle R is calculated. However, in an embodiment, the image quality of the whole image may be flagged as insufficient if there is any area of insufficient image quality inside restored rectangle R. The whole procedure for evaluating the restored image quality has O(1) complexity, because it is not dependent on the input image size, but only on the number of points in the curve approximation, which is assumed to be predefined.

In an embodiment, the following algorithm may be used for image quality assessment of projective distortion:

```
Input :
F is field quadrangle in source image;
R is rectangle of restored field;
1 is minimal scaling coefficient threshold;
n is vertex number of curve approximation.
Output :
True=1, if the restored field is predicted as recognizable;
False=0, otherwise.
01    procedure Q (F,R,l,n)
02        calculate coefficients of projective transformation H: H (R) =F
03        center ← center point of R
04        if h₂,₀²+h₂,₁²=0 then // affine transformation
05            S_c ← S_min (Center, H) according to Equation (1)
06            return S_c ≥ 1
07        R' ← T(R) according to Equation (4) //calculate new coordinates
                                              of rectangle
08        Y_min ← min{R'_iY}_i={1..4}
09        Y_max ← max{R'_iY}_i={1..4}
10        calculate α, β, γ, δ according to Equation (2) and Equation (5)
11        X_sym ← (αγ+βδ) / (α²+β²)
12        no_roots_prev ← True
13        one_root_prev ← False
14        curve ← { }
15        for i={0, .. n−1} do
16            Y_i ← Y_min+i ( (Y_max-Y_min) / (n−1) )
17            calculate D_i according to Equation (6)
18            if D_i>0 then
19                X_{i1,2} ← X_sym ± √D_i
20                if NOT (no_roots_prev) then
21                    Insert (curve, Segment { (X_{i1}, Y_i) , (X_{i−1,1}, Y_{i−1}) } )
22                    Insert (curve, Segment { (X_{i2}, Y_i) , (X_{i−1,2}, Y_{i−1}) } )
23                if no_roots_prev AND i≠0 then
24                    Insert (curve, Segment { (X_{i1}, Y_i) , (X_{i2}, Y_i) })
25                one_root_prev ← False
26                no_roots_prev ← False
27            else if D_i=0 then
28                X_{i1,2} ← X_sym
29                if NOT (one_root_prev) AND NOT (no_roots_prev) then
30                    Insert (curve, Segment { (X_i, Y_i) , (X_{i−1,1}, Y_{i−1}) })
31                    Insert (curve, Segment { (X_i, Y_i) , (X_{i−1,2}, Y_{i−1}) })
32                one_root_prev ← True
33                no_roots_prev ← False
34            else
35                if NOT (one_root_prev) AND NOT (no_roots_prev) then
36                    Insert (curve, Segment { (X_{i−1,1}, Y_{i−1}) , (X_{i−1,2}, Y_{i−1}) })
37                one_root_prev ← False
38                no_roots_prev ← True
39        for each segment from curve do
40            if segment intersects R' then
41                return False
42        S_c ← S_min (center, H) according to Equation (1)
43        return S_c ≥ 1
```

FIG. 5 illustrates a flowchart of an example algorithm 500 for image quality assessment, according to an embodiment. Algorithm 500 may be implemented by one or more software modules executed using one or more processors 110 of a mobile device (e.g., in a client-side embodiment) or a server (e.g., in a server-side embodiment). It should be understood that algorithm 500 corresponds to procedure Q defined in the algorithm above.

In subprocess 505, the projective transformation H, which transforms restored rectangle R to the source quadrangle F, is calculated. Subprocess 505 corresponds to line 02 of the algorithm above.

In subprocess 510, it is determined whether or not the projective transformation H, calculated in subprocess 505, is affine. Subprocess corresponds to line 04 of the algorithm above (i.e., if $h_{2,0}^2+h_{2,1}^2=0$). If the projective transformation H is affine (i.e., "Yes" in subprocess 510), algorithm 500 proceeds to subprocess 545. Otherwise, if the projective transformation H is not affine (i.e., "No" in subprocess 510), algorithm 500 proceeds to subprocess 515. It should be understood that an affine transformation preserves the ratio of lengths of parallel lines. Thus, if projective transformation H is affine, this indicates that the distortion is constant for all points of the quadrangle in the source image $I_{src}$. Thus, only one point needs to be checked.

In subprocess 515, the restored rectangle R is translated to rectangle R' in a new coordinate system using transformation T. This transformation can be used to simplify calculations. Subprocess 515 corresponds to line 07 of the algorithm above.

In subprocess 520, constants and/or variables are calculated and/or initialized. For example, the minimum value of Y (i.e., $Y_{min}$) and the maximum value of Y (i.e., $Y_{max}$) are calculated for the rectangle R'. The line $X=X_{sym}$ represents an axis of symmetry of the minimal and maximal scaling coefficient functions. Furthermore, Boolean values to track whether one root (i.e., "one_root_prev") or no roots (i.e., "no_roots_prev") were seen in a previous iteration, and a buffer for the curve approximation (i.e., "curve"), may be initialized. Subprocess 520 corresponds to lines 08-14 of the algorithm above.

In subprocess 525, algorithm 500 loops through multiple iterations of subprocesses 530 and 535. In particular, algorithm 500 starts from the minimum value of Y, calculated in subprocess 520, and iterates through subprocesses 530 and 535 for different values $Y_i$, according to a step size or calculation, until the maximum value of Y is reached. Subprocess 525 corresponds to line 15 of the algorithm above, and the step calculation corresponds to line 16 of the algorithm above. Once algorithm 500 has iterated through every value of $Y_i$, algorithm 500 proceeds to subprocess 540.

In subprocess 530, the discriminant $D_i$ of the distortion-level curve for the current value $Y_i$ (e.g., as determined in line 16 of the algorithm above), is calculated. Discriminant $D_i$ may be calculated according to Equation (6). Subprocess 530 corresponds to line 17 of the algorithm above.

In subprocess 535, one or more lines segments are added to the curve approximation (e.g., inserted into the buffer for the curve approximation that was initialized in subprocess 520) based on the discriminant $D_i$ that was calculated in subprocess 530 for the current value $Y_i$ and using one or more other constants and/or variables initialized in subprocess 520 (e.g., $X_{sym}$, one_root_prev, and no_roots_prev). Subprocess 535 corresponds to lines 18-38 of the algorithm above. As illustrated in the algorithm above, on each step zero, one or two vertices of the curve approximation are calculated for the current $Y_i$ coordinate. Their number and X values depend on discriminant $D_i$. When discriminant $D_i$ is greater than zero (lines 18-26 of the algorithm above), there are two vertices, with X values determined as $X_{sym}\pm\sqrt{D_i}$. When discriminant $D_i$ is equal to zero (lines 27-33 of the algorithm above), X value of the only vertex is determined as $X_{sym}$. When discriminant $D_i$ is less than zero (lines 34-38 of the algorithm above), there are no vertices for the current $Y_i$ coordinate. Depending on the number of vertices on the current and previous steps, line segments, approximating the curve between the $Y_{i\_1}$ and $Y_i$ coordinates, are constructed. The segments connect either the current vertices with the vertices from the previous step, or the current vertices with each other.

In subprocess 540, algorithm 500 determines whether or not any curve segment in the curve approximation, generated through iterations of subprocesses 525-535, intersects rectangle R'. If any curve segment intersects rectangle R' (i.e., "Yes" in subprocess 540), algorithm 500 returns an indication that there is insufficient image quality (e.g., a Boolean value indicating "false") in subprocess 550. Otherwise, if no curve segment intersects rectangle R' (i.e., "No" in subprocess 540), algorithm 500 proceeds to subprocess 545. Subprocess 540 corresponds to lines 39-40 of the algorithm above. It should be understood that subprocess 540 could be performed after all iterations of subprocesses 525-535 have been completed or in parallel with the iterations of subprocesses 525-535. For example, in a parallel implementation, each curve segment may be evaluated for intersection with rectangle R', after (e.g., immediately after) each curve segment is generated and/or before the next curve segment is generated.

In subprocess 545, algorithm 500 calculates the minimal scaling coefficient as discussed elsewhere herein (e.g., as the length of the semi-minor axis of the ellipse in the source quadrangle F corresponding to a point in the restored rectangle R), and compares it to the threshold l for the text field being evaluated. As discussed elsewhere herein, each of a plurality of fonts may be associated with a different threshold l than one or more others of the plurality of fonts. Thus, algorithm 500 may select the appropriate threshold l to be used in subprocess 545 according to the font being used in the text field under evaluation. This font of a particular text field may be known (e.g., according to a document template) or determined. If the minimal scaling coefficient $s_{min}$ does not satisfy the threshold l (i.e., "No" in subprocess 545), algorithm 500 returns an indication that there is insufficient image quality in subprocess 550. Otherwise, if the minimal scaling coefficient $s_{min}$ satisfies the threshold l (i.e., "Yes" in subprocess 545), algorithm 500 returns an indication that there is sufficient image quality in subprocess 555. It should be understood that the minimal scaling coefficient $s_{min}$ may satisfy the threshold l when it is equal to or greater than (or just greater than) the threshold l, in which case the minimal scaling coefficient $s_{min}$ does not satisfy the threshold l when it is less than (or less than or equal to) the threshold l. Subprocess 545 corresponds to the return instructions in lines 06 and 43 of the algorithm above.

2.5. Text Recognition

Figure 6:
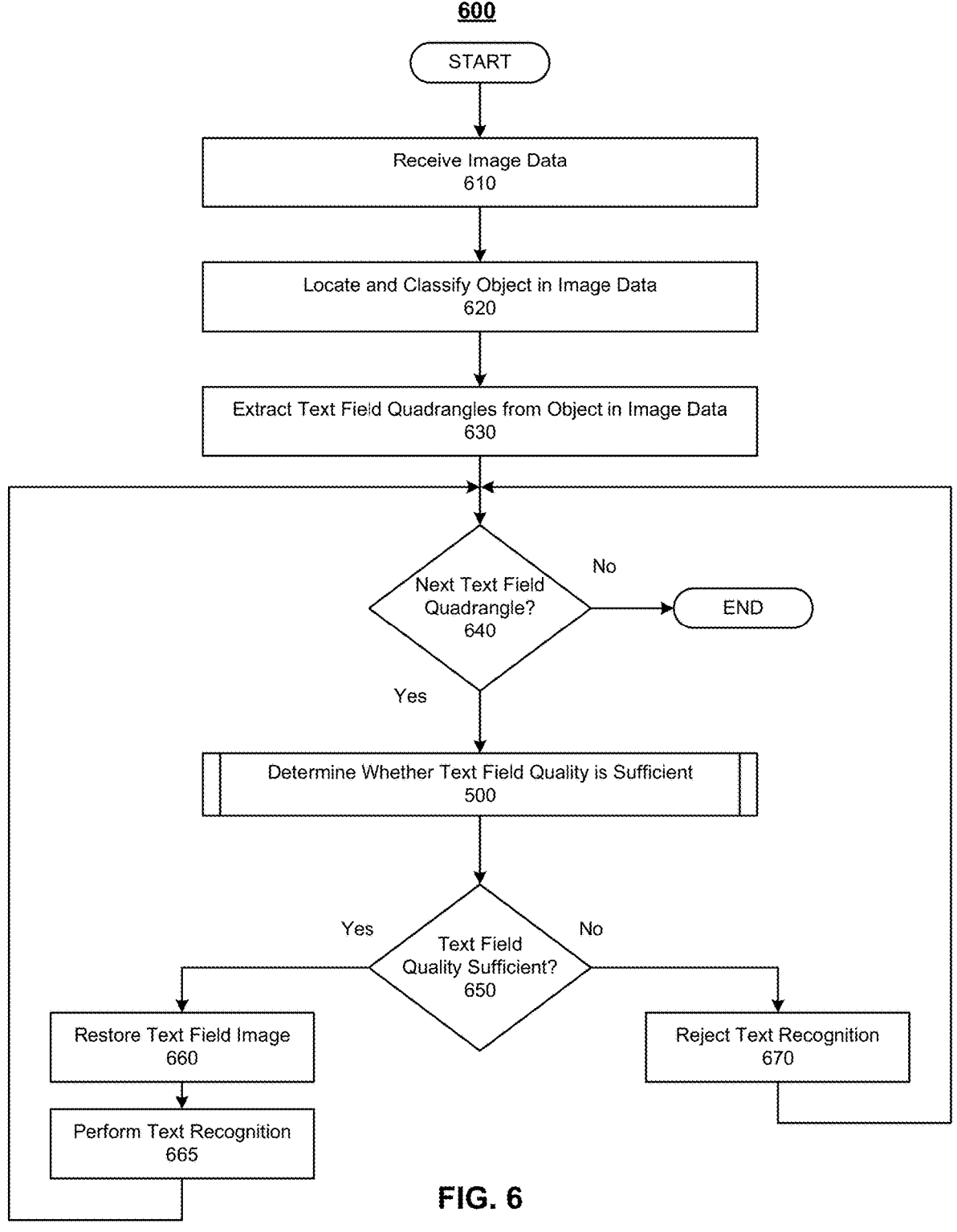
FIG. 6 illustrates a flowchart of an example algorithm for text recognition, according to an embodiment.

FIG. 6 illustrates a flowchart of an example algorithm 600 for text recognition that utilizes algorithm 500 for image quality assessment, according to an embodiment. Algorithm 600 may be implemented by one or more software modules executed using one or more processors 110 of a mobile device (e.g., in a client-side embodiment) or a server (e.g., in a server-side embodiment).

Initially, in subprocess 610, image data is received. The image data may comprise a photograph of an object or a video stream of an object. In either case, the image data may be captured by the camera of a mobile device (e.g., smartphone, tablet computer, etc.) or other device. The image data may be received in real time as the image data is captured or may be received some time subsequent to the image data being captured. While embodiments are primarily described herein as recognizing text in documents, it should be understood that disclosed embodiments may be utilized for text recognition in an image of any type of object with a planar surface (e.g., vehicle, road, traffic sign or other sign, billboard, building, etc.).

In subprocess 620, the position of the object (e.g., document) is located in the image data, and the object is classified (e.g., as a particular type of document). Subprocess 620 may utilize any location and classification method. For example, the object may be located and/or classified using document models that are constructed based on document templates.

In subprocess 630, one or more text field quadrangles (e.g., F) are segmented or otherwise extracted from the located and classified object. Subprocess 630 may utilize any extraction method. For example, the text field quadrangle(s) may be extracted based on a document model corresponding to the document classified in subprocess 620. It should be understood that each text field quadrangle represents the boundaries of a text field that was located and classified in subprocess 620 from the image data received in subprocess 610. The output of subprocess 630 may comprise, for each text field, four points representing the corners of the respective text field quadrangle in the coordinate system of the source image (e.g., $I_{src}$).

In subprocess 640, algorithm 600 loops through an iteration for each text field quadrangle that was extracted in subprocess 630. In particular, algorithm 500 are executed for each text field quadrangle. A restored rectangle (e.g., R) may be retrieved from the document template. The restored rectangle and source quadrangle are then input into algorithm 500 (e.g., subprocess 505 of algorithm 500) to produce a binary determination of whether or not there is sufficient image quality for reliable text recognition. The input restored and source quadrangles may be represented as coordinates of their respective corners or vertices. The inputs to algorithm 500 may also include the minimal scaling coefficient threshold l and/or the number n of steps to be used. In this manner, different thresholds l can be used for different fonts. The font that is associated with a particular text field, represented by the current text field quadrangle under consideration, may be determined based on an association of the font with the text field in the document model.

In subprocess 650, a determination is made as to whether or not the current text field quadrangle under consideration represents a text field with sufficient quality for text recognition. If the text field quality is sufficient (i.e., "Yes" in subprocess 650), the image region of the text field, in the image data received in subprocess 610, may be restored in subprocess 660, and text recognition may be performed on the restored image region of the text field in subprocess 665. Otherwise, if the text field quality is not sufficient (i.e., "No" in subprocess 650), the text recognition may be rejected in subprocess 670, such that text recognition is not performed on the text field.

In an embodiment, the overarching software application may acquire as much text recognition results as possible from each captured image data. Thus, for example, if text recognition for any text field is rejected in subprocess 670, the software application may generate feedback. The feedback may notify (e.g., via a graphical user interface) the user of a user device that captured the image data that the quality is insufficient, and/or prompt the user to recapture the image data or an image of just the text field(s) that were rejected. When recaptured image data is received, process 600 may be re-executed for all of the text fields (e.g., in which case, current results may be combined with prior results) or just for the rejected text fields. Alternatively, if text recognition for any text field is rejected in subprocess 670, the software application may require the user to recapture the image data and may re-execute process 600 without regard to any prior executions of process 600. In this case, it should be understood that process 600 may be stopped upon the first iteration of subprocess 670. In any case, once text recognition has been successfully performed in subprocess 665 on all text fields, the overarching software application may pass the recognized text to downstream processes for further processing or analysis.

3. Experimental Results

Experiments using an implementation of a disclosed embodiment for assessing quality of a projectively distorted text field images will now be described. The experimental results obtained by the disclosed algorithm (e.g., algorithm 500) were compared with the performance of the algorithm described in Awal et al. The experiments were conducted on synthetic images of text fields with varying levels of projective distortion. Synthetic images were used because there was not a dataset available with sufficiently high projective distortion for experimentation. The synthetic images were generated from the document templates presented in the Mobile Identity Document Video (MIDV-2019) dataset. The MIDV-2019 dataset contains 50 different types of annotated identity documents, including 50 template images and video clips of these documents acquired in different conditions.

Only template images were used for the synthetic dataset, with all images scaled to 300 dots per inch (dpi) to obtain comparable pixel sizes for all documents. Ground-truth text field rectangles were used to extract undistorted images of text fields with a 10% margin included around the text fields. Only text fields of numeric dates, document numbers, machine-readable zone (MRZ) lines, and names written in the Latin alphabet were used. Text was recognized in the obtained text field images using the Tesseract Open Source OCR Engine 4.1.1, which employs a long short-term memory (LSTM) network. Incorrectly recognized fields were eliminated from further processing. In the experiment, 184 text fields, collected from all document templates, were used. Since the text in the text fields may have different fonts, font sizes, and other properties, each text field was considered separately in the experiment.

Synthetic data generation for one text field will be described. An original image of a text field f will be denoted $D_f$, and a rectangle bounding the text field will be denoted $R_f$. To test the disclosed algorithm, a set of N projectively distorted field images $\{I_{src,f}^i\}_{i=1 \ldots N}$ were generated with bounding quadrangles $\{F_f^i\}_{i=1 \ldots N}$ and corresponding projective transformations $\{H_f^i\}_{i=1 \ldots N}$:$F_f^i=H_f^i(R_f)$. To generate a distorted quadrangle $F_f^i$, random shifts were added to the corners of $R_f$. Then, the quadrangle $F_f^i$ was downscaled to approximately the same size as the original image $D_f$ for a more representative dataset. It was ensured that the obtained distorted quadrangle $F_f^i$ and the corresponding quadrangle of the whole distorted document were convex. The homography $H_f^i$ was calculated, and the original image $D_f$ was transformed to obtain the distorted field image: $I_{src,f}^i=H_f^i(D_f)$.

Next, the restoration process was conducted. In particular, the distorted images $\{I_{src,f}^i\}_{i=1 \ldots N}$ were rectified with projective transforms that map their bounding quadrangles $F_f^i$ to the rectangles $R_f$:$R_f=H_f^{i-1}(F_f^i)$. Thus, a set of restored images $\{I_{rst,f}^i\}_{i=1 \ldots N}$:$I_{rst,f}^i=H_f^{i-1}(I_{src,f}^i)$ were obtained. The projective mapping of images was conducted using the bilinear interpolation method.

Finally, the ground truth was generated for the problem of binary quality assessment. This was considered to be a binary classification problem, with a positive case when the image of the text field is recognizable and a negative case when the image of the text field is not recognizable. Tesseract was used to recognize the restored text-field images $I_{rst,f}^i$, and the results were compared to the annotations in MIDV-2019. If the recognition result was correct, then the restored image was labeled as recognizable.

To evaluate the performance of the disclosed algorithm against other quality assessment algorithms, the positive predictive value (PPV) and negative predictive value (NPV) were calculated, as follows:

$$PPV = \frac{TP}{TP + FP}$$

$$NPV = \frac{TN}{TN + FN}$$

wherein TP is the number of true-positive samples (i.e., restored text-field images that were correctly recognized by Tesseract and marked as recognizable by the quality assessment algorithm under evaluation), TN is the number of true-negative samples (i.e., restored text-field images that were not recognized by Tesseract and marked as non-recognizable by the quality assessment algorithm under evaluation), FP is the number of false-positive samples (i.e., restored text-field images that were not recognized by Tesseract but marked as recognizable by the quality assessment algorithm under evaluation), and FN is the number of false-negative samples (i.e., restored text-field images that were correctly recognized by Tesseract but marked as non-recognizable by the quality assessment algorithm under evaluation).

The decision made by the disclosed algorithm depends on the minimum scaling coefficient threshold l. Thus, the probability of randomly generating a sample predicted to be positive or negative varies when l changes. To ensure the balance of data used for evaluation, for each value of the minimum scaling coefficient threshold l, the disclosed algorithm was used to mark 1,000 restored text-field images as positive and 1,000 restored text-field images as negative.

In a first experiment, variations in the PPV and NPV were estimated for the disclosed algorithm, depending on the minimum scaling coefficient threshold l. The PPV and NPV functions were calculated separately for each text field f. The values of the minimum scaling coefficient threshold l were varied from 0.075 to 0.9 with a step of 0.025. For each value of the minimum scaling coefficient threshold l, 1,000 images were positively marked and 1,000 images were negatively marked, and then the PPV and NPV were calculated. The parameter n in the disclosed algorithm, which defines the vertex number of the level curve approximation, was set to 100.

Figure 7:
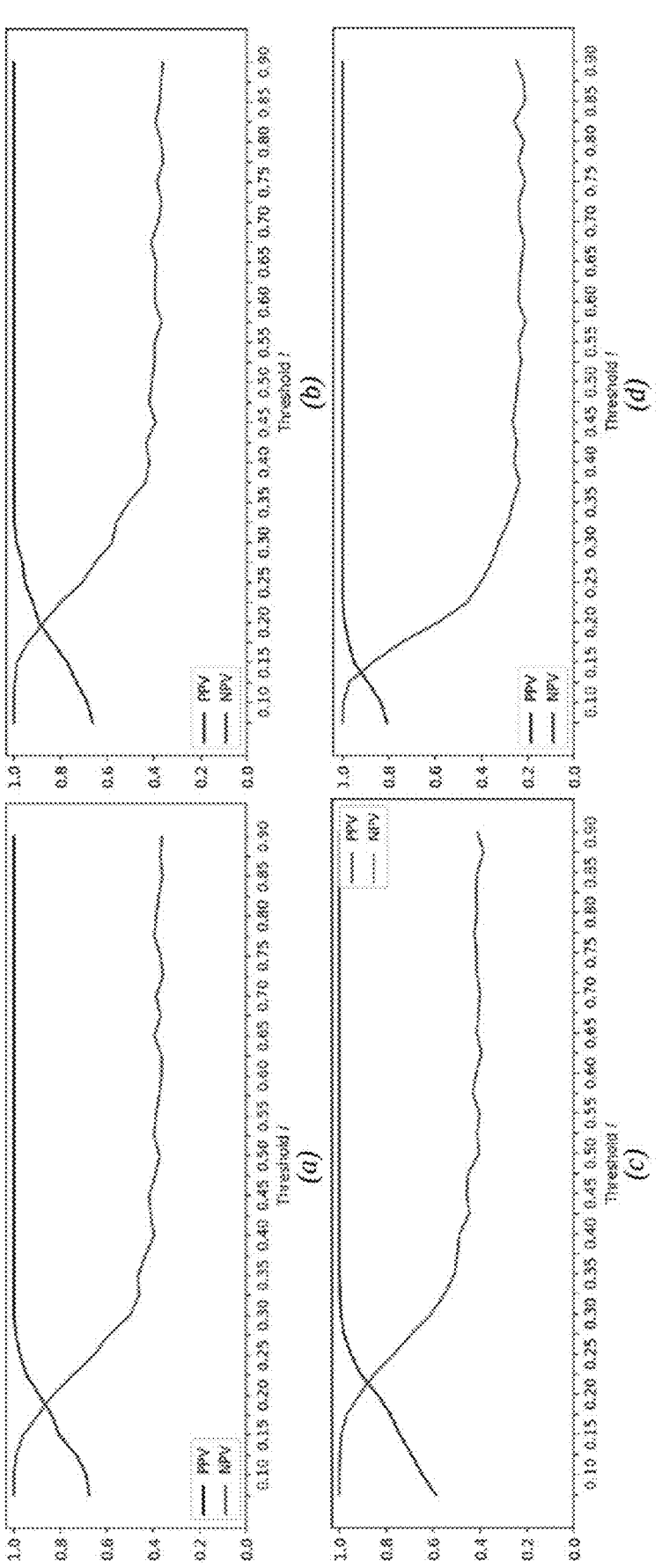
FIG. 7 illustrates predictive value curves for different text fields, according to an example implementation of an embodiment.

FIG. 7 illustrates the estimated PPV and NPV curves that were calculated for four different text fields of an Austrian drivers license. It was assumed that the minimum scaling coefficient threshold l was equal for all characters of one font. Thus, the predictive value functions should be close for different fields of one font and may vary if the font or font properties (e.g., size, boldness, etc.) are changed. The curves in (a)-(c) are for text fields with the same un-bold font and have almost equal predictive values, as expected. This implies that a valid minimum scaling coefficient threshold l can be estimated for all possible text fields of one font in advance. The curve in (d) is for a text field with a bold font, and therefore, differs from the curves in (a)-(c). This difference implies that bold text can be more projectively distorted while still being reliably recognized. Thus, the minimum scaling coefficient threshold l should be chosen separately for each font and font property.

For all text fields, the specific behaviors of the PPV and NPV curves are similar. The greater the minimum scaling coefficient threshold l, the sharper the restored image should be to be marked as recognizable. As mentioned above, the minimum scaling coefficient threshold l is defined as the inverse to the level of distortion θ. As the minimum scaling coefficient threshold l increases, rejection occurs at a lower level of distortion θ. The value of the minimum scaling coefficient threshold l can be chosen according to the cost of the false-positive and false-negative errors. In the case of equal cost, the PPV and NPV are higher than 80% for all four considered text fields. Notably, the predictive value curves that were obtained are non-monotonic. This effect occurs because the OCR is not strictly monotonic with the projective distortion level. However, the tendency toward reduced recognition accuracy is evident.

In a second experiment, the recognition performance, using the disclosed algorithm (e.g., algorithm 500) for rejection, was estimated. The results obtained using the disclosed algorithm was compared to the rejection criterion presented in Awal et al., which assesses the whole distorted document quadrangle. In addition, application of the same algorithm to each text-field quadrangle separately was estimated.

The geometric criterion presented in Awal et al. is based on the analysis of the quadrangle angles. In particular, according to Awal et al., a document quadrangle is rejected if it does not satisfy all of the following conditions:

(1) At least one pair of opposed edges is parallel within a tolerance of 5°:

$$\begin{cases} \left(\angle[\overrightarrow{AB}] - \angle[\overrightarrow{CD}]\right) < 5° \\ \left(\angle[\overrightarrow{AD}] - \angle[\overrightarrow{BC}]\right) < 5° \end{cases}$$

wherein A, B, C, and D are the corners of the document quadrangle and $\angle[\overrightarrow{AB}]$, $\angle[\overrightarrow{CD}]$, $\angle[\overrightarrow{AD}]$, and $\angle[\overrightarrow{BC}]$ denote the angles of the edges with the horizontal axis defined in the range [−90°, 90°].

(2) The average difference in angles between each pair of opposed angles is less than 10°:

$$\begin{cases} \dfrac{|\hat{A} - \hat{B}| + |\hat{C} - \hat{D}|}{2} < 10° \\ \dfrac{|\hat{A} - \hat{D}| + |\hat{B} - \hat{C}|}{2} < 10° \end{cases}$$

wherein $\hat{A}$, $\hat{B}$, $\hat{C}$, and $\hat{D}$ are the angles of the quadrangle defined in the range [0°, 180°].

(3) The average perpendicularity of the four corners is less than 25°:

$$\left| \frac{\hat{A} + \hat{B} + \hat{C} + \hat{D}}{4} - 90° \right| < 25°$$

In order to estimate the system performance and to avoid errors that may occur in the document localization and segmentation stages, distorted field images were synthesized as described above. Before evaluating the performance of the disclosed algorithm, the text-field thresholds for the disclosed algorithm were estimated. Each of the 184 original text-field images $D_f$ was gradually uniformly downscaled from 0.9 to 0.1 of its size with a step of 0.025. The smallest scale that provided a correct recognition result was chosen as the minimum scaling coefficient threshold $l_f$. Then, for each field f and minimum scaling coefficient threshold $l_f$, 1,000 positively marked and 1,000 negatively marked restored text-field images were generated. The parameter n for the disclosed algorithm, defining the vertex number of the level curve approximation, was set to 100. All positive images for all text fields were contained in the overall positive set with a size of 184,000. The overall negative set was similarly obtained. The restored text-field images of both the positive and negative sets were recognized using Tesseract, and the cumulative PPV and NPV values were calculated.

To evaluate the Awal et al. algorithm, two versions of the rejection criterion were used. In the first version, the rejection criterion assessed the document quadrangle, and therefore, ceased further processing of all text fields simultaneously. In the second version, the rejection criterion was applied to each distorted text-field quadrangle. For both versions, the same processes of data generation and performance evaluation were used, except that the set of 1,000 images that were predicted to be recognized was constructed based on the algorithm under evaluation. The same applied to the set predicted to be unrecognized.

The results of the conducted experiments are shown in the table below. The thresholds of the Awal et al. algorithm were defined under the assumption of a much higher cost of false-positive error. The disclosed algorithm outperformed both versions of the Awal et al. algorithm in terms of both PPV and NPV.

| Algorithm | PPV | NPV | TP | FP | TN | FN |
|---|---|---|---|---|---|---|
| Disclosed algorithm (e.g., 500) | 86.7% | 64.1% | 159,622 | 24,378 | 117,998 | 66,002 |
| Awal et al. (document quadrangle) | 79.2% | 24.1% | 145,672 | 38,328 | 44,332 | 139,668 |
| Awal et al. (text-field quadrangle) | 77.2% | 24.6% | 142,098 | 41,902 | 45,331 | 138,669 |

Figures 8, 9:
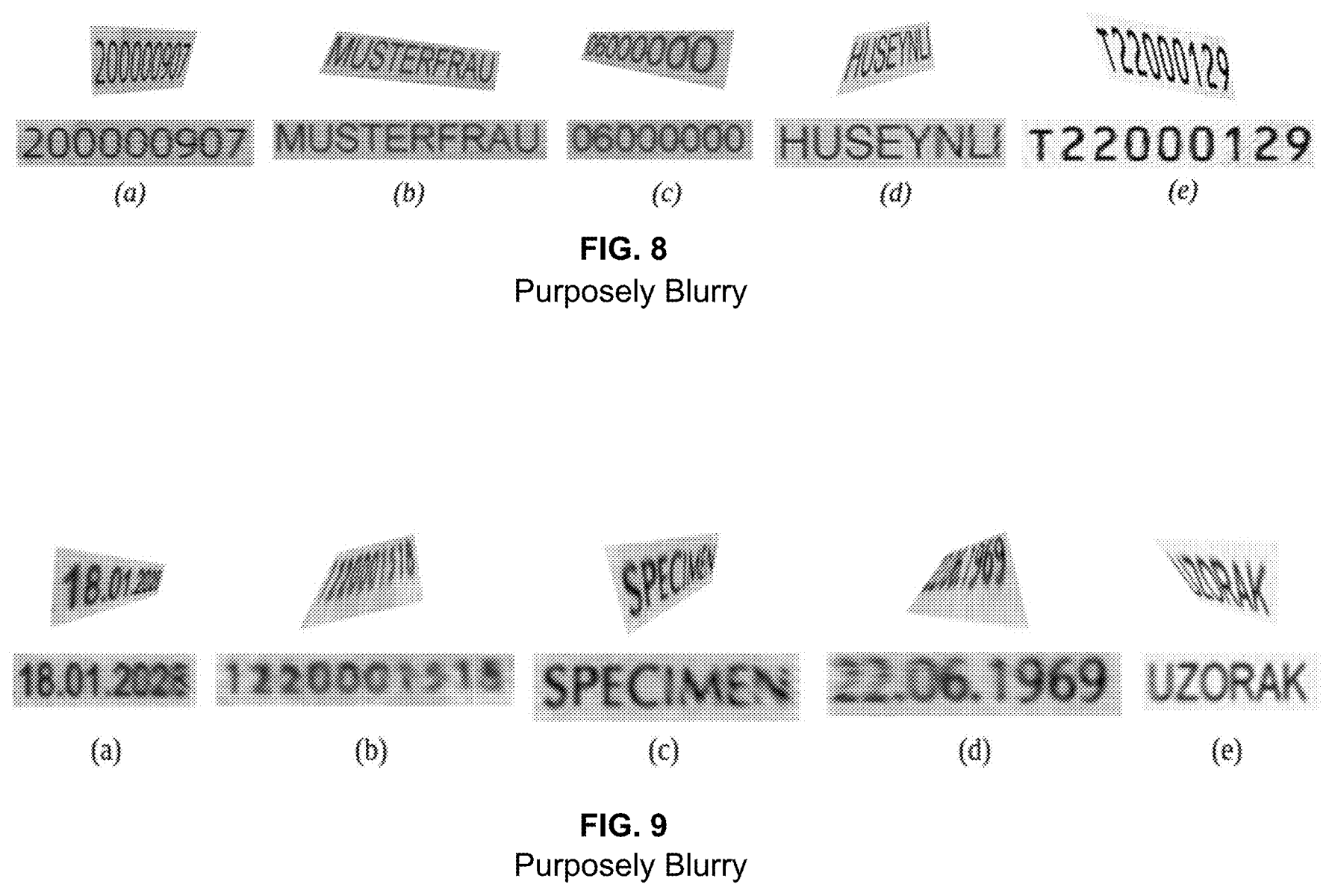

Examples of false-positive and false-negative text-field images for the disclosed algorithm are shown in FIGS. 8 and 9, respectively. As illustrated, in some cases, the recognition error was due to the OCR submodule, while the images themselves can be easily read. In the false-negative examples, the level of corruption differs. For example, text field (b) in FIG. 9 is barely recognizable, while text field (e) in FIG. 9 has adequate sharpness. The main reason for this result is that the minimum possible sharpness was estimated in all directions, but, if the image is scaled orthogonally to the stroke, the blurring effect is small, as illustrated by text field (e) in FIG. 9.

Another possible reason for the errors by the disclosed algorithm is the chosen approach for the estimation of the minimum scaling coefficient threshold l. Due to errors in the recognition module, the minimum scaling coefficient threshold l may be overestimated for some of the text fields. Furthermore, in real applications, the text of a considered document field differs from the text in the template image. The disclosed threshold estimation method is limited to only one possible text version. Thus, a more stable approach to threshold estimation may be used to increase the performance of the disclosed algorithm. Nonetheless, the results demonstrate that the disclosed algorithm for text-field quality assessment can be successfully exploited for recognition reliability prediction.

4. Example Embodiment

Disclosed embodiments address the problem of assessing image quality of restored text fields from projectively distorted document images. In an embodiment, the image quality is interpreted in terms of the reliability of text recognition. Using a priori information about the font used in a text field, the image quality of the restored text field can be estimated based on an analysis of the projective transform. The present disclosure provides a theoretically based method for evaluating the distortion level at a point in the restored image. Advantageously, the disclosed algorithm for binary quality assessment does not depend on image size, and therefore, has O(1) complexity.

The algorithm was tested on synthetic data created from the MIDV-2019 dataset. According to experimental results, the algorithm produces equivalent predictive values (positive and negative) for text strings of the same font and size. However, the algorithm produces different predictive values for text strings of different fonts. Thus, the thresholds for rejecting restored text fields can be estimated in advance for each font, regardless of the particular text that may appear in projectively distorted images of text fields.

The performance of the rejection criterion of the disclosed algorithm was compared to the performance of the rejection criterion presented in Awal et al. The Awal et al. algorithm is designed to assess the whole document quadrangle, and therefore, to reject or accept all document fields simultaneously. Additionally, the same criterion was separately applied for each distorted text field image. The thresholds for the disclosed algorithm were estimated in advance for each text field by iterative downscaling of the undistorted text field image and by performing text recognition on the resulting image. The results demonstrated the superiority of the disclosed algorithm. The cumulative positive predictive value (PPV) for the disclosed algorithm was 86.7%, which is 7.5% higher than the best PPV of the Awal et al. algorithm. The cumulative negative predictive value (NPV), estimated for the disclosed algorithm, was 64.1%, and the difference from the best NPV of the Awal et al. algorithm was 39.5%.

Notably, the disclosed algorithm may be exploited in combination methods for recognizing a text field in a video stream. The disclosed binary image-quality estimation may be used to reevaluate the confidence of the recognition result of one image frame. In addition, since the disclosed algorithm also approximates the distortion-level curve that bounds the low-quality region of the text field image, it can be utilized to reevaluate the confidence of each recognized text character according to its location. This may increase the recognition accuracy.

In an embodiment, a stable method of estimating the thresholds for each font can be used. It may analyze the recognition correctness after restoration from different levels of projective distortion, instead of only scaling transforms. The whole alphabet in each font should be included in this analysis to provide a stable threshold for all possible text strings in the font. In the disclosed algorithm, the process of binary quality estimation, according to the constructed approximation of the distortion-level curve, may be varied. For example, the comparison of the ratio of the sufficient and insufficient region areas to a threshold may be used instead of intersection verification.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising capturing one or more source images;

using at least one hardware processor to, for each of one or more source images:

extract a source quadrangle from the source image, wherein the source quadrangle corresponds to a projectively distorted text field in the source image;

retrieve a restored rectangle, wherein the restored rectangle corresponds to a restored text field in a restoration of the source image;

calculate a projective transformation from the restored rectangle to the source quadrangle;

execute a process to construct an approximation of a curve of a minimal scaling coefficient level on a plane corresponding to the restored rectangle based on calculations of a discriminant of the curve, when the approximation of the curve intersects a representation of the restored rectangle, determine that the restoration of the source image has insufficient image quality for reliable text recognition, and, when the approximation of the curve does not intersect the representation of the restored rectangle, calculate a minimal scaling coefficient at a point inside the restored rectangle, when the minimal scaling coefficient satisfies a threshold, determine that the restoration of the source image has sufficient image quality for reliable text recognition, and, when the minimal scaling coefficient does not satisfy the threshold, determine that the restoration of the source image has insufficient image quality for reliable text recognition;

perform the text recognition if the source image has sufficient image quality for reliable text recognition, otherwise reject the text recognition.

2. The method of claim 1, further comprising using the at least one hardware processor to, for each of the one or more source images, when determining that the restoration of the source image has insufficient image quality for reliable text recognition, preventing the source image from being used in an image restoration process or a text recognition process.

3. The method of claim 2, further comprising using the at least one hardware processor to, when preventing the source image from being used in the text recognition process, provide an indication that the source image has insufficient image quality.

4. The method of claim 1, wherein the one or more source images comprise a plurality of image frames in a video stream, and wherein the method further comprises using the at least one hardware processor to, based on a determination that the restoration of at least one of the plurality of image frames has insufficient image quality for reliable text recognition, reduce a weight of the at least one image frame in a text recognition process that combines image frames to recognize text in the video stream.

5. The method of claim 1, wherein the one or more source images comprise a plurality of image frames in a video stream, and wherein the method further comprises using the at least one hardware processor to, based on a determination that the restoration of at least one of the plurality of image frames has insufficient image quality for reliable text recognition, prevent the at least one image frame from being used in an image restoration process or a text recognition process that combines image frames to recognize text in the video stream.

6. The method of claim 1, wherein the minimal scaling coefficient comprises a ratio of a length of a semi-minor axis in an ellipse, in the source quadrangle, that corresponds to a circle representing a point in the restored rectangle, to a radius of the circle.

7. The method of claim 1, wherein the minimal scaling coefficient comprises a length of a semi-minor axis in an ellipse, in the source quadrangle, that corresponds to a circle representing a point in the restored rectangle.

8. The method of claim 1, further comprising using the at least one hardware processor to select the threshold based on a font of the text field.

9. The method of claim 8, further comprising using the at least one hardware processor to:

determine the font of the text field; and select a predefined threshold associated with the font from a plurality of predefined thresholds associated with a plurality of fonts.

10. The method of claim 9, further comprising using the at least one hardware processor to automatically determine each of the plurality of predefined thresholds by, for each of the plurality of fonts:

for each of one or more sample text field images of a text field in that font, iteratively downscaling the text field image and executing a text recognition process on the downscaled text field image, to determine a smallest scale at which text in that font is correctly recognized by the text recognition process; and associate the determined smallest scale with that font, as the predefined threshold associated with that font.

11. The method of claim 1, further comprising generating the representation of the restored rectangle by transforming the restored rectangle to a new coordinate system.

12. The method of claim 11, wherein the restored rectangle is transformed to the new coordinate system by the following transformation T:

$$(X,Y)=T(x,y)=(h_{2,1}x-h_{2,0}y,h_{2,0}x+h_{2,1})+h_{2,2})$$

wherein X and Y are coordinates in the new coordinate system that correspond to coordinates x and y in the restored rectangle, respectively, and wherein $h_{0,2}$, $h_{1,2}$, $h_{2,2}$ are coefficients in a row of a matrix of the projective transformation.

13. The method of claim 1, wherein constructing the approximation of the curve comprises:

calculating a minimum Y value of the representation of the restored rectangle in a coordinate system;

calculating a maximum Y value of the representation of the restored rectangle in the coordinate system;

for each of a plurality of Y values between the minimum Y value and the maximum Y value, determine two corresponding X values on the curve.

14. The method of claim 13, wherein determining two corresponding X values comprises calculating two corresponding X values as:

$$X_1 = \frac{\alpha\gamma + \beta\delta}{\alpha^2 + \beta^2} + \sqrt{D}$$

$$X_2 = \frac{\alpha\gamma + \beta\delta}{\alpha^2 + \beta^2} - \sqrt{D}$$

$$D = l^2\frac{h_{2,0}^2 + h_{2,1}^2}{\alpha^2 + \beta^2}Y^4 - Y^2 - \frac{(\alpha\delta - \beta\gamma)^2}{\left(\alpha^2 + \beta^2\right)^2} + \frac{\det(H)^2\left(h_{2,0}^2 + h_{2,1}^2\right)}{l^2 Y^2\left(\alpha^2 + \beta^2\right)},$$

$$Y \neq 0$$

$$\alpha = h_{0,0}h_{2,1} - h_{0,1}h_{2,0}$$

$$\beta = h_{1,0}h_{2,1} - h_{1,1}h_{2,0}$$

$$\delta = h_{2,0}c_3 + h_{2,1}c_4$$

$$\gamma = h_{2,0}c_1 + h_{2,1}c_2$$

$$c_1 = h_{0,0}h_{2,2} - h_{0,2}h_{2,0}$$

$$c_2 = h_{0,1}h_{2,2} - h_{0,2}h_{2,1}$$

$$c_3 = h_{1,0}h_{2,2} - h_{1,2}h_{2,0}$$

$$c_4 = h_{1,1}h_{2,2} - h_{1,2}h_{2,1}$$

wherein l is the threshold, det(H) is a determinant of a projective transformation matrix H representing the projective transformation, and $h_{i,j}$, i,j∈ {0,1,2} are coefficients of the projective transformation matrix H.

15. The method of claim 1, further comprising using the at least one hardware processor to, for each of the one or more source images:

determine if the projective transformation is affine;

when determining that the projective transformation is not affine, executing the process; and, when determining that the projective transformation is affine, instead of executing the process, calculate the minimal scaling coefficient at a single point inside the restored rectangle, when the minimal scaling coefficient satisfies the threshold, determine that the restoration of the source image has sufficient image quality for reliable text recognition, and, when the minimal scaling coefficient does not satisfy the threshold, determine that the restoration of the source image has insufficient image quality for reliable text recognition.

16. The method of claim 1, wherein the minimal scaling coefficient is calculated as:

$$s(p_0, H) = \sqrt{\frac{\mathrm{trace}(J_0^T J_0) - \sqrt{\mathrm{trace}(J_0^T J_0)^2 - 4\det(J_0)^2}}{2}}$$

$$\det(J_0) = \frac{\det(H)}{(h_{2,0}x_0 + h_{2,1}y_0 + h_{2,2})^3}$$

$$\mathrm{trace}(J_0^T J_0) = \frac{T_1^2 + T_2^2 + T_3^2 + T_4^2}{(h_{2,0}x_0 + h_{2,1}y_0 + h_{2,2})^4}$$

$$T_1 = \alpha y_0 + c_1, \ T_2 = -\alpha x_0 + c_2, \ T_3 = \beta y_0 + c_3, \ T_4 = -\beta x_0 + c_4$$

$$\alpha = h_{0,0}h_{2,1} - h_{0,1}h_{2,0}, \ \beta = h_{1,0}h_{2,1} - h_{1,1}h_{2,0}$$

$$c_1 = h_{0,0}h_{2,2} - h_{0,2}h_{2,0}, \ c_2 = h_{0,1}h_{2,2} - h_{0,2}h_{2,1},$$

$$c_3 = h_{1,0}h_{2,2} - h_{1,2}h_{2,0}, \ c_4 = h_{1,1}h_{2,2} - h_{1,2}h_{2,1}$$

wherein s is the minimal scaling coefficient, $p_0$, is the point with coordinates $x_0$ and $y_0$, H is a projective transformation matrix representing the projective transformation, det(H) is a determinant of the projective transformation matrix H, and $h_{i,j}$, i, j∈{0,1,2} are coefficients of the projective transformation matrix H.

17. A system comprising:

at least one hardware processor; and one or more software modules that are configured to, when executed by the at least one hardware processor, for each of one or more previously captured source images, extract a source quadrangle from the source image, wherein the source quadrangle corresponds to a projectively distorted text field in the source image;

retrieve a restored rectangle, wherein the restored rectangle corresponds to a restored text field in a restoration of the source image;

calculate a projective transformation from the restored rectangle to the source quadrangle;

execute a process to construct an approximation of a curve of a minimal scaling coefficient level on a plane corresponding to the restored rectangle based on calculations of a discriminant of the curve, when the approximation of the curve intersects a representation of the restored rectangle, determine that the restoration of the source image has insufficient image quality for reliable text recognition, and, when the approximation of the curve does not intersect the representation of the restored rectangle, calculate a minimal scaling coefficient at a point inside the restored rectangle, when the minimal scaling coefficient satisfies a threshold, determine that the restoration of the source image has sufficient image quality for reliable text recognition, and, when the minimal scaling coefficient does not satisfy the threshold, determine that the restoration of the source image has insufficient image quality for reliable text recognition;

perform the text recognition if the source image has sufficient image quality for reliable text recognition, otherwise reject the text recognition.

18. A non-transitory computer-readable medium having instructed stored thereon, wherein the instructions, when executed by a processor, cause the processor to, for each of one or more previously captured source images:

extract a source quadrangle from the source image, wherein the source quadrangle corresponds to a projectively distorted text field in the source image;

retrieve a restored rectangle, wherein the restored rectangle corresponds to a restored text field in a restoration of the source image;

calculate a projective transformation from a restored rectangle to a source quadrangle;

execute a process to construct an approximation of a curve of a minimal scaling coefficient level on a plane corresponding to the restored rectangle based on calculations of a discriminant of the curve, when the approximation of the curve intersects a representation of the restored rectangle, determine that the restoration of the source image has insufficient image quality for reliable text recognition, and, when the approximation of the curve does not intersect the representation of the restored rectangle, calculate a minimal scaling coefficient at a point inside the restored rectangle, when the minimal scaling coefficient satisfies a threshold, determine that the restoration of the source image has sufficient image quality for reliable text recognition, and, when the minimal scaling coefficient does not satisfy the threshold, determine that the restoration of the source image has insufficient image quality for reliable text recognition;

perform the text recognition if the source image has sufficient image quality for reliable text recognition, otherwise reject the text recognition.

* * * * *